(12) United States Patent
Bose et al.

(10) Patent No.: US 10,146,915 B2
(45) Date of Patent: Dec. 4, 2018

(54) PUBLICATION OF COLLABORATIVE FILE TO LIBRARY

(71) Applicant: salesforce.com, inc., San Francisco, CA (US)

(72) Inventors: Miko Arnab Bose, San Francisco, CA (US); Robert J. Snell, London (GB); Mark Francis Movida, Berkeley, CA (US); Valliappan Annamalai Natarajan, San Ramon, CA (US); Adam Thielemann Wegel, San Francisco, CA (US); Matthew Charles Hagenian, San Francisco, CA (US); Durgesh Singh, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 359 days.

(21) Appl. No.: 15/078,430

(22) Filed: Mar. 23, 2016

(65) Prior Publication Data

US 2017/0075919 A1    Mar. 16, 2017

Related U.S. Application Data

(60) Provisional application No. 62/218,440, filed on Sep. 14, 2015.

(51) Int. Cl.
*G06F 17/00* (2006.01)
*G06F 21/00* (2013.01)
*G06F 21/62* (2013.01)

(52) U.S. Cl.
CPC .......... *G06F 21/00* (2013.01); *G06F 21/6245* (2013.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Hung D Le
(74) *Attorney, Agent, or Firm* — Weaver Austin Villeneuve & Sampson LLP

(57) ABSTRACT

Disclosed are examples of systems, apparatus, methods and computer program products for sharing and publishing files. In one aspect, the database system can maintain a user database, a file database and a library. The database system can receive a first request initiated by a first user to share a first file with one or more second users and, responsive to the first request, enable a second set of one or more permissions for each of the second users. The database system also can receive a second request initiated by the first user to publish the first file to the library and, responsive to the second request, publish the first file to the library. The database system additionally can restrict access to the published file based on permissions associated with the library.

20 Claims, 22 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,287,214 B1* | 10/2007 | Jenkins ............ G06F 17/30595 707/999.006 |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,029,285 B2* | 10/2011 | Holmen ............... A61C 8/0025 433/174 |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,463,821 B2* | 6/2013 | Lubbers ............ G06F 17/30896 707/793 |
| 8,484,111 B2 | 7/2013 | Frankland et al. |
| 8,490,025 B2 | 7/2013 | Jakobson et al. |
| 8,498,994 B2 | 7/2013 | Prabaker et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,221 B2 | 6/2014 | Prabaker et al. |
| 9,171,180 B2 | 10/2015 | Prabaker et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Dice et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |

(56) References Cited

U.S. PATENT DOCUMENTS

| | | |
|---|---|---|
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0262439 A1* | 11/2005 | Cameron ............ G06F 17/3089 715/239 |
| 2008/0216009 A1* | 9/2008 | Drallos ............... G06F 3/04815 715/776 |
| 2008/0243871 A1* | 10/2008 | Anand ................ G06F 17/3089 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0259681 A1* | 10/2009 | Lubbers ............ G06F 17/30896 |
| 2011/0218958 A1 | 9/2011 | Warshaysky et al. |
| 2011/0247051 A1 | 10/2011 | Bulumulla et al. |
| 2012/0042218 A1 | 2/2012 | Cinarkaya et al. |
| 2012/0072422 A1* | 3/2012 | Rollins ............... G06F 17/2745 707/737 |
| 2012/0130955 A1* | 5/2012 | Li ....................... G06F 11/1451 707/654 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0172925 A1 | 6/2014 | Goldbrenner et al. |
| 2014/0359537 A1 | 12/2014 | Jakobson et al. |
| 2015/0006289 A1 | 1/2015 | Jakobson |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0019241 A1 | 1/2016 | Prabaker et al. |
| 2016/0070717 A1 | 3/2016 | Bergner et al. |

\* cited by examiner

PUBLICATION OF COLLABORATIVE FILE TO LIBRARY

PRIORITY DATA

This non-provisional patent application claims the benefit of priority under 35 U.S.C. 119(e) to U.S. Provisional Patent Application Ser. No. 62/218,440 titled PUBLICATION OF COLLABORATIVE FILE TO LIBRARY WITH RICH METADATA, by Bose et al., and filed on 14 Sep. 2015, which is hereby incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

This patent document relates generally to facilitating collaboration on a file among a number of collaborating users, as well as the publishing of a collaborative file to a trusted truth location where the file can be made discoverable and accessible to a broader audience of viewers.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who do not need to possess expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 12 shows an example WUI including a user feed including a feed item for an updated version of the file shown in FIG. 10 according to some implementations.

FIG. 13 shows an example WUI including a listing of files owned by a user and an Actions menu next to the updated version of the file of FIG. 10 according to some implementations.

FIG. 18 shows an example WUI including an overview of libraries accessible to a user according to some implementations.

FIG. 21 shows an example edit overlay displayed after selecting to edit metadata associated with the file of FIG. 20.

DETAILED DESCRIPTION

Figure 1A:
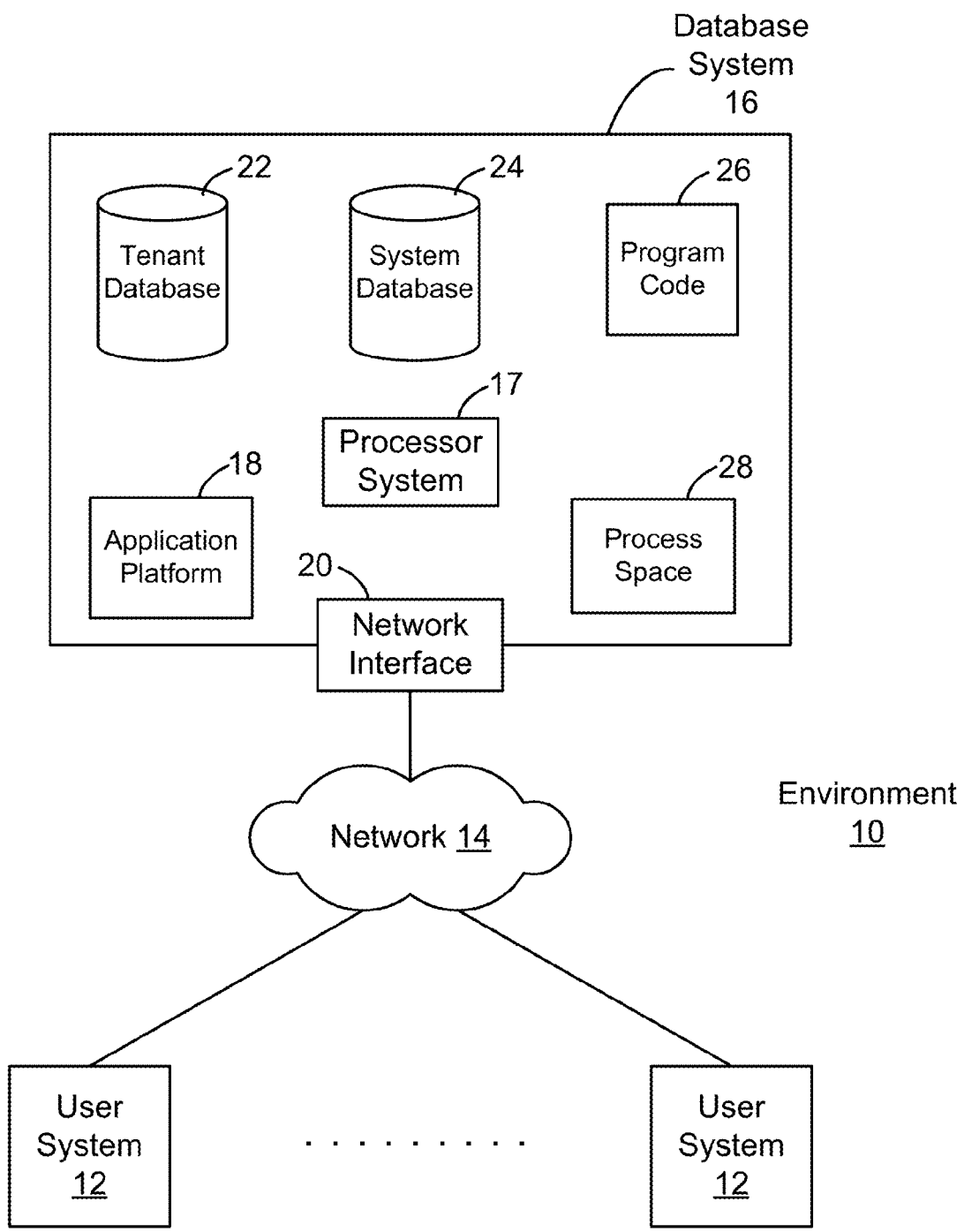
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting; other implementations may be used and changes may be made to the disclosed implementations without departing from their spirit and scope. For example, the blocks of the methods (also referred to herein as "processes") shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; for example, the phrase "A, B or C" is intended to include the possibilities of "A," "B," "C," "A and B," "B and C," "A and C" and "A, B and C."

This disclosure relates generally to database systems, computer-readable storage media and processes facilitating collaboration on a file among a number of collaborating users. Various implementations further relate to database systems, computer-readable storage media and processes enabling the subsequent publishing of a collaborative file to a trusted "truth location", for example, such as a library maintained by a database system. Some implementations more specifically relate to facilitating a seamless transition between a collaboration stage, during which an owner, author or other authorized user of a file can share and collaborate on a collaborative version of the file with other collaborating users, and a publication stage, during which a published version of the file is discoverable and viewable by a broader audience of viewers beyond the owner and the collaborating users.

In some implementations, a collaboration stage of a file is triggered responsive to the owner, author or other authorized user of the file (the terms "owner," "author" and "authorized user" are used interchangeably herein unless otherwise indicated) selecting to share the file with one or more selected collaborating users. Responsive to the selection to share the file, the database system assigns, grants or otherwise enables (the terms "assign," "grant" and "enable" are used interchangeably herein unless otherwise indicated) a set of one or more permissions to each of the selected collaborating users providing the collaborating users with particular access privileges to a shared collaborative version of the file. In some implementations, the transition from the collaboration stage to the publication stage is triggered responsive to the owner of the file selecting to publish (or "share") the file to a particular library. Responsive to the selection to publish the file, the database system deactivates, divests, deletes, removes or otherwise disables (the terms "deactivate," "divest," "delete," "remove" and "disable" are used interchangeably herein where appropriate), from the collaborating users, some or all of the permissions previously enabled for the collaborating users with respect to the collaborative version of the file during the collaboration stage. As a result of the divestment, the access privileges of the collaborating users with respect to the collaborative version of the file are downgraded, reduced or eliminated. In some implementations, responsive to the file being published to the library, access privileges with respect to the published version of the file are defined by permissions associated with the respective library in which the file is published. For example, in some implementations, the access privileges for a given user with respect to a published file in a library are governed by the respective user's access privileges to the library in general, which are based on the permissions enabled for the user with respect to the library.

Some implementations also relate to providing an interface enabling the owner of the file, and in some use cases also one or more other authorized users, to associate rich metadata with the published version of the file. Some implementations more specifically relate to increasing the discoverability of the published version of the file with respect to a broader audience of users having viewing (or "read") access to the library in which the file is published. For example, some implementations facilitate the discovery of files by users not having familiarity with such files based on the metadata associated with the files. Additionally, in some implementations, users finding files of interest in such libraries can be assured that the files are the most up-to-date versions of such files by virtue of their publication in such libraries.

In some implementations, the owners, collaborators, employees, members or other users described herein are registered users of an interactive online enterprise social network (also referred to herein as an enterprise collaborative network, an enterprise network, a collaborative network, an enterprise social networking system or environment, an enterprise collaborative networking system or environment, an enterprise networking system or environment, or a collaborative networking system or environment). Such enterprise networks are increasingly becoming a common way to facilitate communication among users associated with an enterprise, such as a corporation, business, or other for-profit or non-profit organization. One example of an online enterprise network is Chatter®, provided by salesforce.com, inc. of San Francisco, Calif. salesforce.com, inc. is a provider of enterprise social networking services, customer relationship management (CRM) services and other database management services, some or all of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter®, and more generally to enterprise social networking, those of ordinary skill in the art should understand that the disclosed techniques are neither limited to Chatter® nor to any other services and systems provided by salesforce.com, inc., and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user (or "client") systems 12, a network 14, and a database system 16 (also referred to herein as a "cloud-based system"). The database system 16 further includes a processor system 17, an application platform 18, a network interface 20, a tenant database 22 (including a user database) for storing tenant data 23 (including user data), a system database 24 for storing system data 25, program code 26 for implementing various functions of the database system 16, and process space 28 for executing database system processes and tenant-specific processes, such as executing applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the database system 16, is a service that is made available to users outside of the enterprise (or enterprises) that own, maintain or provide access to the database system 16. As described above, such users generally do not need to be concerned with building or maintaining the database system 16. Instead, resources provided by the database system 16 may be available for such users' use when the users need services provided by the database system 16; that is, on the demand of the users. Some on-demand database services can store information from one or more tenants into tables of a common database image to form a multi-tenant database system (MTS) 16. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of the database system 16 to execute, such as the hardware or software infrastructure of the database system 16. In some implementations, the application platform 18 enables the creation, development, management and execution of one or more applications by the provider of the on-demand database service, by users accessing the on-demand database service via user systems 12, or by third party application developers accessing the on-demand database service via user systems 12.

In some implementations, the database system 16 implements a web-based customer relationship management (CRM) system. For example, in some such implementations, the database system 16 includes application servers configured to implement and execute CRM software applications as well as to provide related data, code, forms, renderable web pages and documents and other information to and from user systems 12, and to store to, and retrieve from, a database related data, objects, and web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the database system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the database system 16.

According to some implementations, the database system 16 is configured to provide web pages, forms, applications, data and media content to user (client) systems 12 to support the access by user systems 12 as tenants of the database system 16. The database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline back-ups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the database system 16 and the network 14, but other techniques can be used in addition to or instead of these techniques. In some implementations, the network interface 20 between the database system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the database system 16) of the user system 12 to access, process and view information, pages and applications available to it from the database system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the database system 16 or other systems or servers. For example, the user interface device can be used to access data and applications hosted by the database system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by the authorizations or permissions (or "permission sets" or "permission levels") for the current user of such user system. For example, where a salesperson is using a particular user system 12 to interact with the database system 16, that user system can have the capacities allotted to the salesperson. However, while an administrator is using that user system 12 to interact with the database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels.

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The database system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the database system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
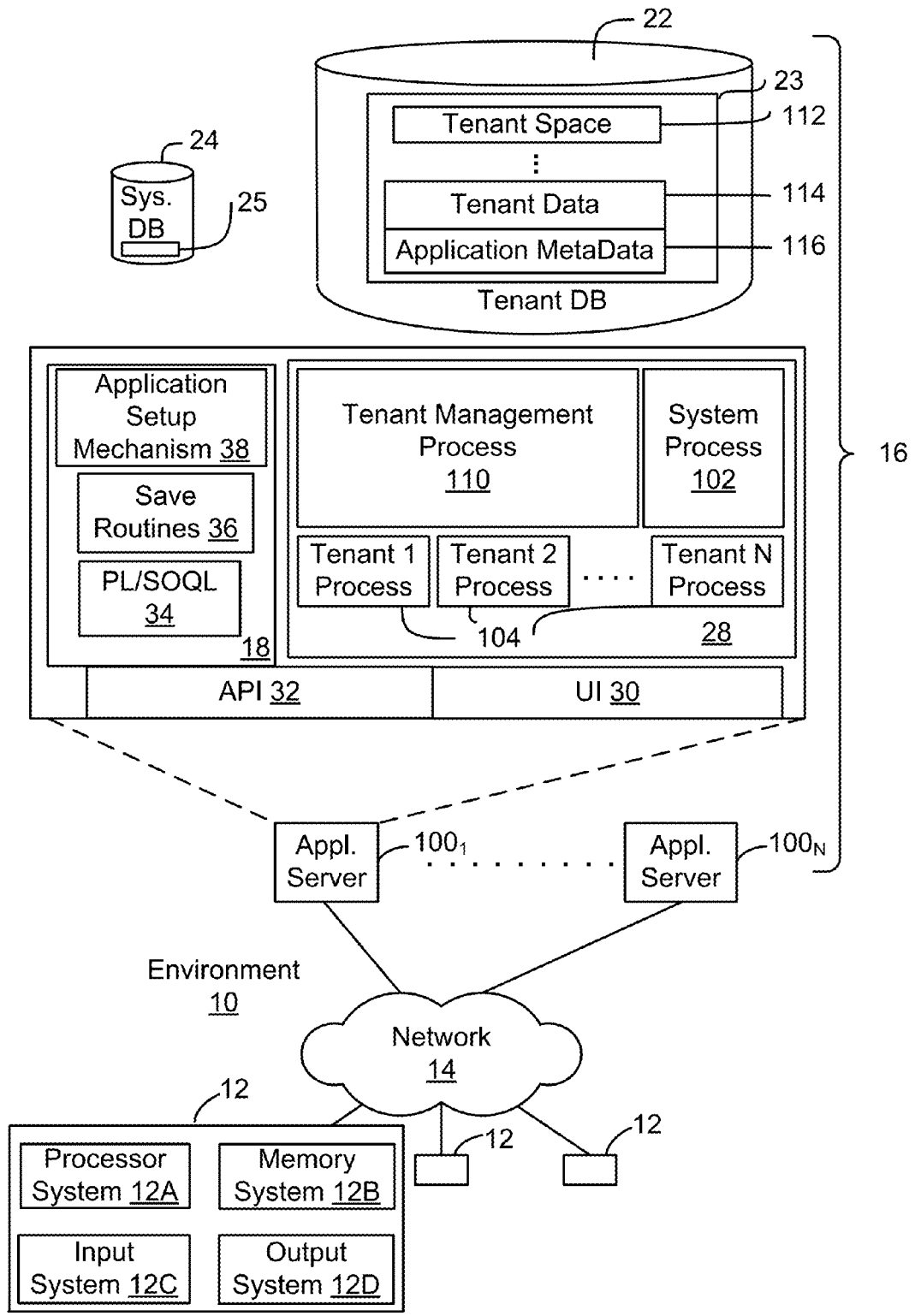
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the database system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application (or "app") servers $100_1$-$100_N$. Each of the application servers $100_1$-$100_N$ (also referred to collectively herein as "the application server 100") is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The database system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the database system 16. However, it will be apparent to one skilled in the art that other transport protocols can be used to optimize the system 16 depending on the network interconnections used.

In some implementations, each application server 100 is configured to handle requests for any user associated with any organization that is a tenant of the database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, the database system 16 can be a multi-tenant system that handles storage of, and access to, different objects, data and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the database system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the database system 16. Such requests and updates can involve sending one or more queries to tenant database 22 or system database 24. The database system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
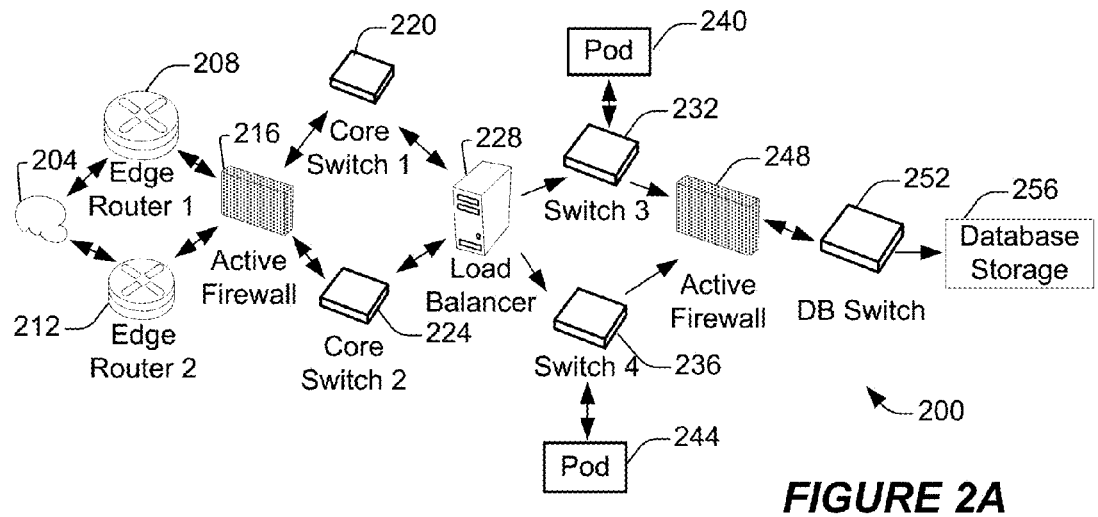
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
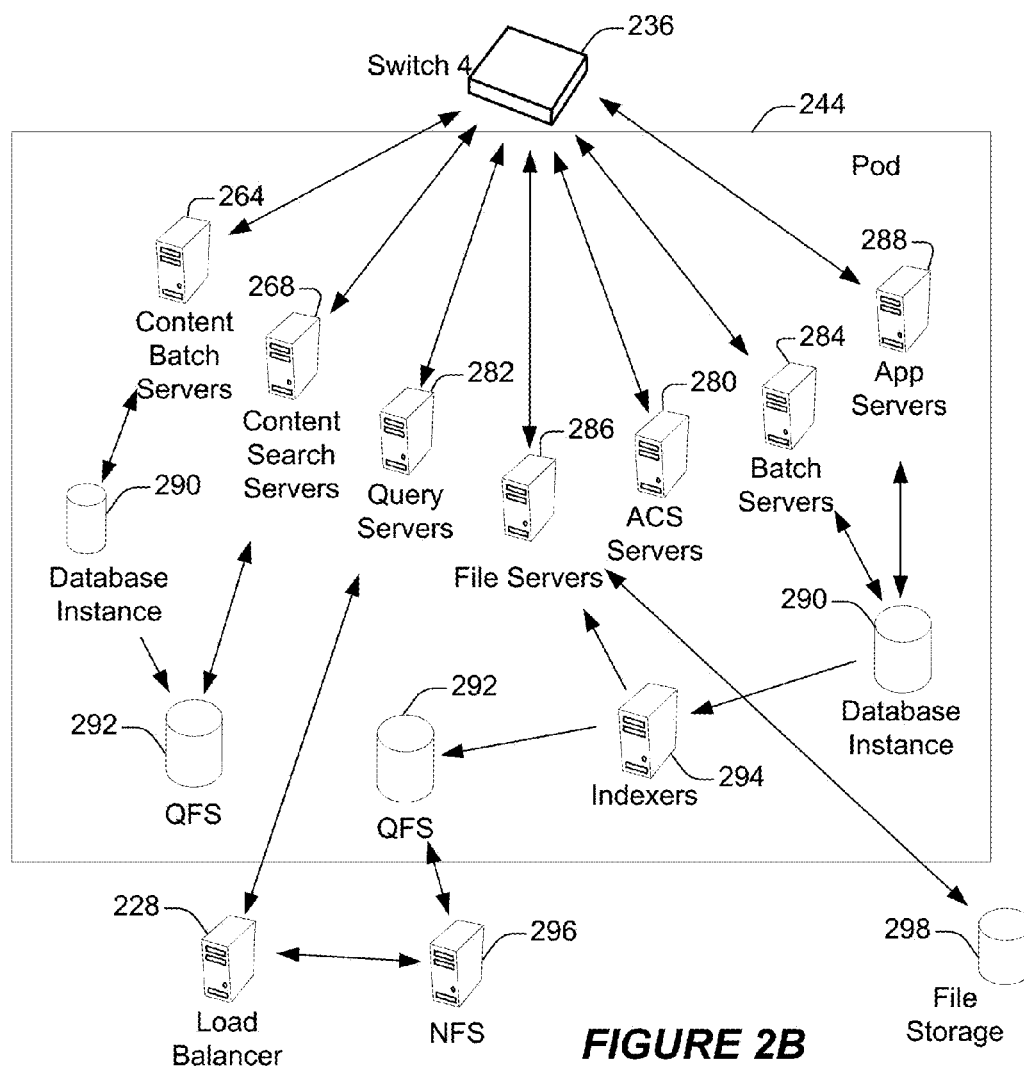
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Networking

As described above, in some implementations the database system 16 includes application servers 100$_1$-100$_N$ that can implement or host one or more applications for providing various on-demand or cloud-computing features or services described herein. In some implementations, one or more of the application servers 100$_1$-100$_N$ implement or host an enterprise social networking platform. In some implementations, the enterprise social networking platform enables each tenant of the database system 16 to create, customize, build or access an enterprise social network for use by users of the respective organization (tenant).

Enterprise social networks can be implemented in various settings, including businesses, organizations and other enterprises (all of which are used interchangeably herein). For instance, an enterprise social network can be implemented to connect users within a business corporation, partnership or organization, or a group of users within such an enterprise. For instance, Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to database system 16. In an example implementation, each organization or a group within the organization can be a respective tenant of the system.

In some implementations, each user of the database system 16 is associated with a "user profile." A user profile refers generally to a collection of information (also referred to herein as "user data") about a given user. The user data can include general information, such as a name, a title, a phone number, a photo, a biographical summary, or a status (for example, text describing what the user is currently doing, thinking or expressing). The user data associated with a user profile also can include various permissions defining the ability of the user to interact with various data objects. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

In some implementations, a "community" refers to a collection of one or more users within an organization that is a tenant of the database system 16 and one or more persons or enterprises outside of the organization that may or may not necessarily be tenants of the database system 16. For example, a community can enable users of an organization to connect with various partners outside of the organization including various third-party partners outside of the social networking system to facilitate one or more shared goals, objectives, or activities. For example, such partners can include distributors, resellers and suppliers, among other desirable partners. In some implementations, multiple communities can be created for or by an organization for different purposes and for connecting or collaborating with different partners. In some implementations, a community also can have a community feed.

A "record" generally refers to a data entity, such as an instance of a data object created by a user or a group of users of the database system 16. Such records can include, for example, data objects representing and maintaining data for accounts (for example, representing a business relationship with another enterprise). In some implementations, each record is assigned a record type, which can be identified by a RecordTypeID. Examples of account record types include: customers (for example, users or organizations who pay the enterprise money), customer support (for example, users or organizations who pay the enterprise money to support them), households (for example, organizations in a business-to-consumer model), partners (for example, organizations who pay the enterprise money and to whom the enterprise pays money), suppliers (for example, organizations to whom the enterprise pays money), and other organizations including organizations with whom no money is exchanged. Other examples of record types in addition to accounts can include cases, opportunities, leads, projects, contracts, orders, pricebooks, products, solutions, reports and forecasts, among other possibilities.

For example, an account record can be for a business partner or potential business partner, an actual or potential customer, an actual or potential supplier, an actual or potential distributor, or a client, among other possibilities. A record such as an account can include information describing an entire enterprise or subsidiary of an enterprise. As another example, a record such as an account record itself can include a number of records. For example, a customer account can include opportunities, contracts, and orders. As another example, a partner record can include a project or contract that a user or group of users is working on with an existing partner, or a project or contract that the user is trying to obtain with a partner. A record also can include various data fields and controls that are defined by the structure or layout of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections"

with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item (such as a feed-tracked update, post, or status update). In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, other media files, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, other media files, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

III. Enterprise Networking Architecture

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users (also referred to herein as "user data") including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some such implementations, each row of the Users Table represents a unique user. Each row can include an OrgID in a first column, a user identifier UserID in a second column, and various information about the user (again also referred to herein as "user data") in one or more additional columns. For example, a third column can include an identification of a user type (for example, a standard user or a portal user), a fourth column can include the user's actual name or screen name, a fifth column can include the user's email address, and a sixth column can include a password. In some alternative implementations, these or additional columns can include other information about or pertaining to the users.

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some such implementations, each row of the Groups Table represents a unique group. Each row can include an OrgID in a first column, a GroupID in a second column, and various information about the group in one or more additional columns. For example, a third column can include a group type (for example, an identification of whether the group is public or private), a fourth column can include a name or title of the group, a fifth column can include a UserID associated with the owner of the group (for example, the user that created the group), a sixth column can include information about the group (for example, a short description of a membership characteristic such as a purpose, objective or other relating quality of the members), and a seventh column can include a description of the group (for example, a longer description of the group's purpose or objective and membership characteristics). In some implementations, the information or description can include clickable or otherwise selectable textual or other user interface (UI) elements (for example, hyperlinks) that direct the user to the respective page associated with the selected element. In some alternative implementations, these or additional columns can include other information about or pertaining to the groups.

In some implementations, communities are stored as specialized groups within the Groups Table. In some other implementations, communities are stored in a separate Communities Table and have unique CommunityIDs.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some such implementations, each row of the Group-User Table represents a defined relationship, association, link or subscription (all of which are used interchangeably herein where appropriate) between a particular group and users subscribed to the group. Each row can include an OrgID in a first column, a GroupID in a second column, and at least one UserID in one or more third columns. Thus, each row defines a subscription relationship in which a user identified by a UserID in the third column is subscribed to the group identified by the GroupID in the second column, and in which the group identified by the GroupID in the second column is within the organization identified by the OrgID in the first column of the same row. In some alternative implementations, additional columns can include other information about or pertaining to the subscriptions between the users and groups.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some such implementations, each row of the Records Table represents a unique record. Each row can include an OrgID in a first column, a RecordID in a second column, and various information about the record in one or more additional columns. For example, a third column can include a record type, a fourth column can include a name or title of the record and a fifth column can include the owner or creator of the record. In some alternative implementations, these or additional columns can include other information about or pertaining to the records.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some such implementations, each row of the Record-User Table represents a subscription between a particular record and users subscribed to the record. Each row can include an OrgID in a first column, a RecordID in a second column, and at least one UserID in one or more third columns. Thus, each row defines a subscription relationship in which a user identified by a UserID in the third column is subscribed to the record identified by the RecordID in the second column, and in which the record identified by the RecordID in the second column is within the organization identified by the OrgID in the first column of the same row. In some alternative implementations, additional columns can include other information about or pertaining to the subscriptions between the users and records.

In some implementations, the database system 16 includes a "Feed Items object." The Feed items object is a data structure that can be represented or conceptualized as a "Feed Items Table" that associates users, records and groups to posts, comments, files or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

In some such implementations, each row of the Feed Items Table represents a defined relationship or link between a particular feed item and an associated user, record or group. Each row can include an OrgID in a first column, a FeedItemID in a second column, a UserID of the publishing user or owner of the feed item (for example, the user that submitted the publication associated with the feed item) in a third column, and a feed item body in a fourth column. That is, in some implementations, each row is associated with a particular feed item and the particular feed item is uniquely identified by the respective FeedItemID. The feed item body can include the content to be displayed in or with the feed item when displayed in a network feed. For example, the content in the feed item body can include the text of a publication submitted by the publishing user. The content in the feed item body also can include identifiers, links or addresses to separately stored documents, videos, images or other files or other publications to be displayed with the feed as part of the feed item. For example, in some implementations, the links to the files are displayed in the first hierarchical level of the feed item or a second hierarchical level of the feed item. In some other implementations, the files themselves (or a preview of the files) are displayed as part of the feed item.

In some implementations, other columns can include UserIDs, GroupIDs or RecordIDs of associated users, groups and records that have been @-mentioned by the publishing user as part of the publication. In some implementations, a ParentID can be specified in another column. The ParentID can include, for example, the UserID, RecordID or Group ID corresponding to the user feed, record feed or group feed where the publication was submitted. Another column can include a timestamp associated with a time the publication was submitted. Other columns can include text or links associated with feed-tracked updates to the feed item. Other columns can include the UserIDs of users that have "liked" the post, file or other publication in the feed item. Other columns can include the UserIDs of users that have shared the publication in the feed item.

Other columns of the Feed Items Table can include CommentIDs identifying comments submitted on the publication and to be subsequently included in, for example, a second hierarchical level within the associated feed item when displayed in a network feed. In some such implementations, the database system 16 includes a "Comment Items object." The Comment Items object is a data structure that can be represented or conceptualized as a "Comment Items Table" that associates comments to associated feed items to which the comments were submitted (or "published"). In some implementations, the Comment Items Table includes all of the comments made by users within the organization. In some other implementations, there can be a Comment Items Table for each division, department, team or other sub-organization within an organization. In implementations in which the organization is a tenant of a multi-tenant enterprise social network platform, the Comment Items Table can include all of the comments within all of the organizations that are tenants of the multitenant enterprise social network platform.

In some such implementations, each row of the Comment Items Table represents a defined relationship or link between a particular comment and an associated feed item to which the comment was published. Each row can include an OrgID in a first column, a CommentID in a second column, a FeedItemID in a third column, a UserID of the publishing user that submitted the comment in a fourth column, and a Comment body in a fourth column. That is, in some implementations, each row is associated with a particular comment and the particular comment is uniquely identified by the respective CommentID. The comment item body can include the content to be displayed in or with the feed item when displayed in a network feed. For example, the content in the comment item body can include the text of a comment submitted by a publishing user. The content in the feed item body also can include links or addresses to separately stored files to be included in the comment when displayed in a network feed. For example, in some implementations, the links to the files are displayed in the comment, while in some other implementations, the files themselves (or a preview of the files) are displayed as part of the comment. In some implementations, other columns can include UserIDs, GroupIDs or RecordIDs of associated users, groups and records that have been @-mentioned by the published user in the comment.

Enterprise social network news feeds are different from typical consumer-facing social network news feeds (for example, Facebook®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

IV. Permission Sets

As described above, in some implementations each user has a corresponding user profile in the database system 16 (for example, in the tenant database 22). In addition to general information (or "user data") about the respective user (for example, name, title, phone number, photograph or avatar, biographical summary, status, among other information), each user profile also includes data defining the respective user's ability to interact with other information stored in the database system 16. In some implementations, a user profile can be characterized as a role-based access control container. In other words, a user profile can be considered as an abstract object that, among other data or information about a user, can define at least one role of the respective user. In turn, a user's role can inform (at least partially) what information the user has access to and the rights the user has with respect to that information. For example, as a user profile can define a role, the set of permissions (or "permission set") included in the profile can define the rights and access privileges associated with the tasks, functions, responsibilities or privileges associated with that role within the respective organization.

In some implementations, an administrator of (or for) an enterprise or other organization can define or be provided with various standard user profiles. Each of the standard (or "base" or "default") user profiles can be considered a base object or structure of a particular user's user profile. In some implementations, when a user is added to the database system 16 for the first time the user is assigned one of a number of available standard user profiles. For example, such standard user profiles can include "sales representative," "sales manager," "services specialist," "technical support analyst," "engineer," "marketing analyst," or "revenue analyst," among other possibilities that may be desired by, made available to, or defined by an organization. In some implementations, each standard user profile includes a corresponding standard set of permissions enabled for a user assigned that standard user profile. As one non-limiting example, all users of an organization having the role of sales representative can be assigned a standard user profile associated with a sales role in the enterprise. Similarly, all users having the role of technical support analyst can be assigned a standard profile associated with a technical support role in the enterprise; all users having the role of marketing analyst can be assigned a standard profile associated with a marketing role in the enterprise; and all users having the role of software engineer can be assigned a standard profile associated with a software engineering role in the enterprise.

As described above, each user's user profile also generally includes other information about the user such as information about, identifying or otherwise associated with the user. In other words, while each user in the enterprise has a unique user profile, in some implementations each user's profile includes a standard (or "default") set of permissions associated with a respective standard user profile assigned to the user. In this way, an administrator can grant an additional permission to, modify a permission of, or remove a permission from, all users assigned to a particular one of the standard user profiles simultaneously. That is, for example, by making a change to the default set of permissions included in or with that standard user profile, as opposed to granting, modifying or removing the permission on an individual user basis.

In some implementations, data or information about users (including users' respective user profiles) can be arranged in a layered, leveled or hierarchical (used interchangeably herein wherein appropriate) object structure in the database system 16. For example, a user profile can be considered one level of abstraction in such a layered data object. A user profile can be considered a data object that includes information about the user (for example, in one or more lower level data objects or fields). In some implementations, the user profile additionally includes a default set of permissions enabled for the user (for example, as a permissions data object). By way of didactic example, the default set of permissions can include an enabled first permission ("Perm A"), an enabled second permission ("Perm B") and an enabled third permission ("Perm C").

In some implementations, the default set of permissions (as well as the other sets of permissions described herein) can include one, two, ten, or virtually any other desired or required number of permission settings. In some implementations, each set of permissions can include one or more user permissions, object permissions, field permissions, class permissions, page permissions, service provider permissions, connected application permissions, application settings, tab settings, record type permissions, or other desired permission settings (all referred to collectively herein simply as "permissions"). In some implementations, one or more of the permissions are Boolean permissions, for example, in the sense that the permission for a particular feature is either enabled or not enabled.

In some implementations, each set of permissions can define, be assigned to, or otherwise be associated with one or more sets of presentation settings. In some implementations, each set of presentation settings defines the presentation (or "configuration") of a UI provided for display to a user when requesting a data object of a particular data object type, such as a record of a particular record type. For example, in response to a request from a user to access, view or otherwise interact with a record, the application server 100 generates and provides for transmission and presentation to the user a UI displaying various UI elements. The UI elements can include various information about the record, reports, charts, links (for example, to other records, other users, contacts, or other content within or external to the database system 16), lists (for example, lists of other associated records such as cases for an account record), tasks, command buttons, fields, parameters, controls or other informative, interactive, adjustable or editable UI elements associated with the record (referred to collectively herein simply as "UI elements").

As is evident, a UI can include a large amount and variety of information as well as enable a large number and variety of controls or actions. In some implementations, not all of the possible information and UI elements associated with a record are included in the UI transmitted for display to all users. For example, it can be desirable to reduce or limit the information or UI elements that are displayed, editable, controllable or actionable by different users at different times to make the UI more relevant, useful, concise, efficient or aesthetically pleasing, or to limit or prevent the disclosure or altering of particular information by particular users or classes of users.

In some implementations, one or more additional (or "secondary") sets of permissions can be layered over a user's profile. For example, a data object including a second set of permissions can be layered over the user profile, and a data object including a third set of permissions can be layered over the second set of permissions, and so on. In some implementations, any desired number of different sets of permissions can be layered over a user profile. In some implementations, because some or all of the permissions can be additive, by adding (or "layering") one or more additional sets of permissions over a single user profile, the user profile can be associated with virtually any number of sets of permissions in addition to the default set of permissions included in the standard user profile. For example, in some implementations, if a permission is enabled in the default set of permissions included in a standard user profile, but the same permission is not enabled (or "disabled") in an overlying second set of permissions, the permission is still enabled for the user. Similarly, if a permission is not enabled in the default set of permissions, but the same permission is enabled in an overlying second set of permissions, then the permission is still enabled for the user. In other words, in some implementations, if a permission is enabled in at least one of the sets of permissions associated with a user profile, then the permission is enabled for the respective user. In some implementations, a permission is not enabled for a user when the permission is not enabled in any of the sets of permissions associated with the user profile.

In this way, the permissions included in the user's user profile (for example, the default set of permissions) can remain fixed or unchanged across users associated with a particular standard user profile, while the permissions granted to a particular one of the users at a particular time can be based on, for example, a current, new, temporary, or time-varying role, sub-role (within a larger role), set of duties, task, assignment, responsibility, or a combination of these (also referred to collectively herein as a "role") associated with a particular record or record type. Additionally or alternatively, the permissions granted to a particular one of the users at a particular time can be based on the role of the user with respect to a record during a particular stage in a process or flow.

As an example of one specific implementation or application, assume that a user's assigned standard user profile (and associated "standard" or "default" role) permits the viewing of particular information associated with a record of a particular record type. In such case, the user's default set of permissions can include an enabled read permission associated with the information. However, in some instances, an administrator may need or desire to grant the particular user the capability to edit or modify the information, but not grant this capability to other users assigned the same standard user profile. In such case, the administrator can expand the particular user's default role, or add an additional role, by layering a second set of one or more permissions over the user's user profile that includes an enabled "edit" permission associated with the information.

In other words, the user's default role can be expanded from that defined based on the assigned standard user profile to include the additional permissions needed by the user to fulfill the user's expanded role. Or in other terms, the user's default role can be said to remain unchanged, while the user can be assigned an additional or secondary role in addition to the user's default role. In this manner, each set of permissions can be associated with a different role or sub-role of the user. Additionally, in some implementations, each set of permissions can further define a role of the user with respect to records of different record types. In other words, a user's role in the context of accessing a record of a particular record type can be different than the role in the context of accessing a record of another record type.

V. Publication of Collaborative File to Library

Various implementations relate generally to database systems, computer-readable storage media and processes facilitating collaboration on a file among a number of collaborating users. Various implementations further relate to database systems, computer-readable storage media and processes enabling the subsequent publishing of the file to a trusted "truth location", for example, such as a digital library maintained by the database system 16. Some implementations more specifically relate to facilitating a seamless transition between a collaboration stage, during which an owner, author or other authorized user of a file can share and collaborate on a collaborative version of the file with other collaborating users, and a publication stage, during which a published version of the file is discoverable and viewable by a broader audience of viewers beyond the owner and the collaborating users.

In some implementations, a collaboration stage of a file is triggered responsive to the owner, author or other authorized user of the file (the terms "owner," "author" and "authorized user" are used interchangeably herein unless otherwise indicated) selecting to share the file with one or more selected collaborating users. Responsive to the selection to share the file, the database system assigns, grants or otherwise enables (the terms "assign," "grant" and "enable" are used interchangeably herein unless otherwise indicated) a set of one or more permissions to each of the selected collaborating users providing the collaborating users with particular access privileges to a shared collaborative version of the file. In some implementations, the transition from the collaboration stage to the publication stage is triggered responsive to the owner of the file selecting to publish (or "share") the file to a particular library. Responsive to the selection to publish the file, the database system deactivates, divests, deletes, removes or otherwise disables (the terms "deactivate," "divest," "delete," "remove" and "disable" are used interchangeably herein where appropriate), from the collaborating users, some or all of the permissions previously enabled for the collaborating users with respect to the collaborative version of the file during the collaboration stage. As a result of the divestment, the access privileges of the collaborating users with respect to the collaborative version of the file are downgraded, reduced or eliminated. In some implementations, responsive to the file being published to the library, access privileges with respect to the published version of the file are defined by permissions associated with the respective library in which the file is published. For example, in some implementations, the access privileges for a given user with respect to a published file in a library are governed by the respective user's access privileges to the library in general, which are based on the permissions enabled for the user with respect to the library.

Some implementations also relate to providing an interface enabling the owner of the file, and in some use cases also one or more other authorized users, to associate rich metadata with the published version of the file. Some implementations more specifically relate to increasing the discoverability of the published version of the file with respect to a broader audience of users having viewing (or "read") access to the library in which the file is published. For example, some implementations facilitate the discovery of files by users not having familiarity with such files based on the metadata associated with the files. Additionally, in some implementations, users finding files of interest in such libraries can be assured that the files are the most up-to-date versions of such files by virtue of their publication in such libraries.

The functionality for enabling the implementations broadly outlined in the preceding three paragraphs above, as well as other implementations disclosed herein, can be hosted by a single- or multi-tenant database system such as the database system 16 described with reference to FIGS. 1A, 1B, 2A and 2B. As described above, in some implementations the database system 16 includes application servers $100_1$-$100_N$ that can implement or host one or more platforms and applications for providing various on-demand or cloud-computing features or services described herein. In some implementations, one or more of the application servers $100_1$-$100_N$ also provide functionality for enabling the implementations outlined in the preceding paragraphs and further disclosed hereinafter.

Figure 3:
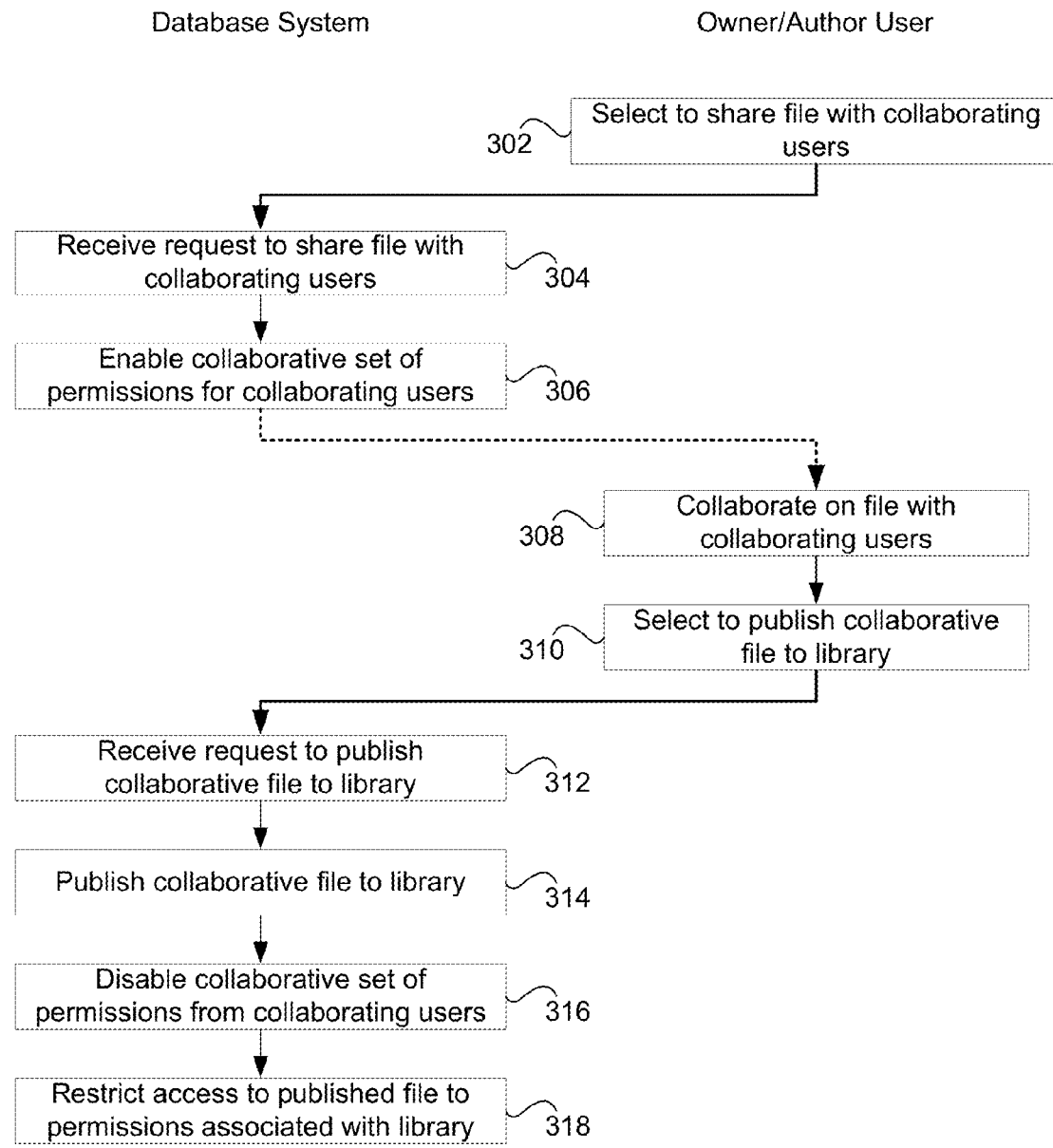
FIG. 3 shows a flowchart illustrating an example process for collaborating on a file and publishing the file to a library according to some implementations.

FIG. 3 shows a flowchart illustrating an example process 300 for collaborating on a file and publishing the file to a library according to some implementations. In some implementations, the process 300 begins in block 302 with an owner of a file selecting to share the file with one or more other users (hereinafter referred to as "collaborating users" or simply as "second users"). Block 302 can generally include both a selection by the owner of the file to share as well as a selection by the owner of the other users to whom the file will be shared. The owner can select and share the file via a number of mechanisms or methods. In some implementations, the owner shares the file with the collaborating users via an enterprise networking feed, such as a user feed, a group feed, or a record feed. In some other implementations, the owner shares the file with the collaborating users via a file details page associated with the file (described in more detail below). Responsive to the owner's selection, the owner's computing device (for example, a user system 12) submits a request to the database system that can include an identification of the selected file as well as identifications of each of the selected collaborating users.

In block 304, the database system receives the request to share the selected file with the selected collaborating users and, responsive to the request, enables one or permissions for each of the selected collaborating users in block 306. The set of permissions enabled for each of the collaborating users in block 306 (also referred to herein as a "collaborative set of permissions") can include, for example, viewing (or "read") permissions as well as permissions to edit, download, and otherwise interact with the file beyond simply viewing the file (including "write" permissions). The owner of the file also includes a set of permissions (also referred to herein as an "owner set of permissions"). The owner set of permissions generally includes the permissions granted to collaborating users as well as additional permissions, for example, permissions to share the file, publish the file, delete the file, and associated metadata to the file, among other possible examples.

In block 308, the owner and other collaborating users collaborate on the file to finalize the file for sharing to a broader audience or otherwise advance the file to a later stage in development or dissemination. Although referred to as a single block, collaboration in block 308 can last for days, weeks, or months or more. For example, collaboration in block 308 can generally persist until the owner of the file decides that collaboration on the file is over. In various implementations, the owner of the file and the collaborating users can collaborate on the file in block 308 using one or more of a variety of mechanisms and tools, some of which are provided as services by the database system. For example, the owner can post the file to a network feed where it will appear as a feed item. The owner and other collaborating users also can, in some implementations, download and upload new revised versions of the file via interaction with the feed item. Additionally or alternatively, the owner and other collaborating users can provide comments on the file or on revised versions of the file via interaction with the feed item. Additionally or alternatively, the owner and other collaborating users can use various network feeds to plan and schedule meetings or discussions to discuss the file.

When the owner determines that the file is in a finalized form, the owner can then select to publish the collaborative file in block 310 to a trusted truth location such as a library maintained by the database system. Publication to such a library also is referred to herein as "sharing" the file with the library. Block 310 can generally include both a selection by the user of a particular library to which to publish ("share") the file, as well as the selection or creation of information to be added to or otherwise associated with the published file (also referred to herein as "metadata"). Such metadata can not only provide useful information for subsequent viewers of the file, but also can facilitate the discovery of the file after it is shared to the library, for example, by other users unfamiliar with the existence of the file, with the content of the file, or with the location of the file.

In block 312, the database system receives the request to publish the selected file with the selected library, and responsive to the request, publishes the file to the library in block 314. Publishing the file in block 314 can include storing the file in a different storage location associated with the library within the database system, or in some other implementations, changing or updating a status of the file in its original location, for example, to a "published" status, a "non-collaborative" status, a "shared with library" status, or other status indicating the file is in a publication stage or no longer in a collaborative stage. In such latter implementations, a record object associated with the file can include a field identifying the library to which the file is published. Additionally or alternatively, a record object associated with the library can include a field identifying the file.

In block 316, the database system also disables some or all of the permissions in the collaborative set of permissions previously enabled for the collaborating users in block 306. For example, the database system can downgrade the access privileges of the collaborating users by disabling their previously held collaborative permissions to edit the file. In some implementations, the database system more generally, in block 318, restricts access to the published file in the library to the permissions associated with the library. For example, in some implementations, the access controls with respect to the published file become governed by the associated library to which the file is published. For example, the access privileges of the collaborating users with respect to the published file are defined by the permissions such users have with respect to the library itself. More generally, the access privileges of the any users of the database system with respect to the published file are defined by the permissions such users have with respect to the library itself. In some implementations, except for library administrators or other users having sufficiently-privileged managerial or supervisory roles, the access privileges of all users can be limited to viewing privileges based on the limited permissions such users have respect to shared libraries. In some such implementations, only a library administrator can edit, update or otherwise modify a file after its publication to the library. In some other implementations, the owner of the file also can maintain an owner set of privileges enabling the owner to edit, update or otherwise modify an owned file after publication to a library. In some such implementations, the owner can be granted a specific set of permissions with respect to the library that enable the owner to only edit, update or modify files owned by the owner within the library. In other words, the owner's access privileges with respect to the published file also can be governed by the owner's access privileges with respect to the library, as opposed to the owner's access privileges to the file prior to its publication in the library.

Figure 4:
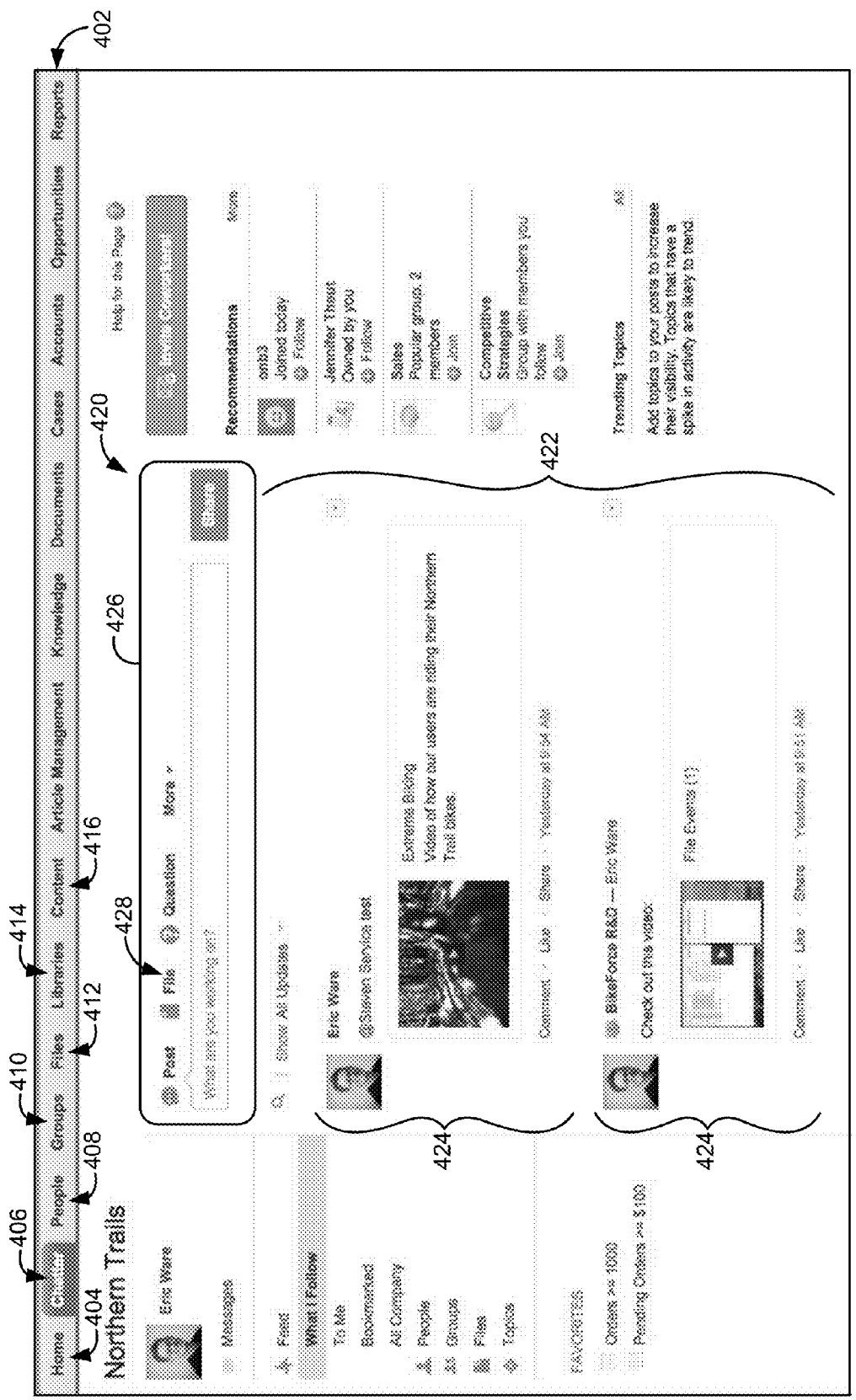
FIG. 4 shows an example web-based user interface (WUI) including an enterprise network feed according to some implementations.

FIG. 4 shows an example web-based user interface (WUI) 400 including an enterprise network feed according to some implementations. The WUI 400, along with the other WUIs described herein, can initially be generated or constructed by the database system (for example, the database system 16) and transmitted as a renderable electronic structured document to a user's local computing device (for example, a user system 12 as described above) for rendering and display by the user's computing device. The database system can transmit the renderable structured document via one or more wired or wireless networks or network connections (for example, network 14 described above) to the user's computing device. A web browser or other client-side rendering application executing in the user's computing device renders the received structured document for display on the user's computing device as a rendered WUI. The database system enables the user to interact with one or more applications or services provided by the database system to access or modify (if the user has the requisite permissions to do so) information via the WUI. In some implementations, the structured document generated by the database system and transmitted to the user's computing device, as well as the WUI presented after rendering, can generally utilize or be constructed with, for example, one or more of Hypertext Markup Language (HTML), Extensible Markup Language (XML), Extensible HyperText Markup Language (XHTML), Java, JavaScript, asynchronous JavaScript and XML (AJAX), JavaScript Object Notation (JSON), Apache Flex, ActiveX, cascading style sheets (CSS), among other suitable markup languages, object-oriented programming languages, scripting languages, style sheets, or other languages, protocols, frameworks, development kits, techniques or models, as well as content or resource locators used to identify and retrieve content from one or more locations internal or external to the database system.

The WUI 400 is an example of a tabbed document interface (TDI). Towards the top of the WUI 400 is a tab bar 402 including a plurality of selectable tabs. In the example implementation shown, the tab bar 402 includes a "Home" tab 404, a "Chatter" tab 406, a "People" tab 408, a "Groups" tab 410, a "Files" tab 412, a "Libraries" tab 414, a "Content" tab 416, an "Article Management" tab, a "Knowledge" tab, a "Documents" tab, a "Cases" tab, an "Accounts" tab, an "Opportunities" tab, and a "Reports" tab. Each of the tabs in the tab bar 402 can be selected to display an associated sub-pane (also referred to herein as a "page," "sub-page," "sub-panel," "sub-window" or "sub-UI"). In the example illustrated in FIG. 4, the Chatter tab 406 is selected. Because the Chatter tab 406 is selected, the WUI 400 displays a Chatter sub-pane 420, which includes a network feed 422. The network feed 422 includes a plurality of feed items 424. In the particular example shown, the network feed 422 is a user feed showing feed items 424 associated with other users, groups, files or other records which the user "Eric Ware" is subscribed to (or "follows").

As described above, Chatter® is an enterprise networking platform provided by salesforce.com inc. of San Francisco, Calif. Chatter® facilitates collaboration among users of an organization (and in some instances with affiliates of the organization), facilitates the efficient dissemination of various information to such users, and generally promotes the engagement of such users with one another, with the organization as a whole, with interests of the organization, and in some cases, with other users outside of the organization. However, the present disclosure is not limited to Chatter® or to any other particular networking system, environment, platform, application or feature. Indeed, the implementations described herein, and the teachings of this disclosure as a whole, can be applied, practiced or otherwise implemented in a variety of different contexts using a variety of different systems, techniques and mechanisms. As such, the teachings of this disclosure, and the implementations disclosed herein, can be adapted to, applied to, integrated with, or otherwise used in conjunction with other database systems, networking systems, environments, platforms, and applications. In the spirit of this broad applicability, the Chatter tab 406 and the Chatter sub-pane 420 also may be referred to hereinafter as the networking tab 406 and the networking sub-pane 420, respectively.

Referring back to block 302 of the process 300, an authorized user of a file (for example, the owner or author of the file) can select to share a file using a publication interface 426. For example, in the implementation shown in FIG. 4, the authorized user can select a "File" action button or tab 428 (hereinafter the "File button 428") within the publication interface 426. In some implementations, while or after the File button 428 is selected, the authorized user can select the file of interest to share by selecting a "Select a File" action button (hereinafter a "Select button") or an "Upload a File" action button (hereinafter an "Upload button"). In some implementations, if the authorized user selects the Upload button, an overlay, pop-up window, or new page is displayed that includes an interface enabling the authorized user to select a file from a file directory associated with the authorized user's local computing device, for example, from a hard drive of the local computing device or from an external memory device coupled with the local computing device (or more generally, from a storage location external to the database system). The authorized user can then select the file to be uploaded to the database system using the interface. Alternatively, if the authorized user selects the Select button, an overlay, pop-up window or new page can be displayed that includes an interface for selecting a file already stored within the database system, or a file having a reference already stored in the database system (described in more detail below).

Figure 5:
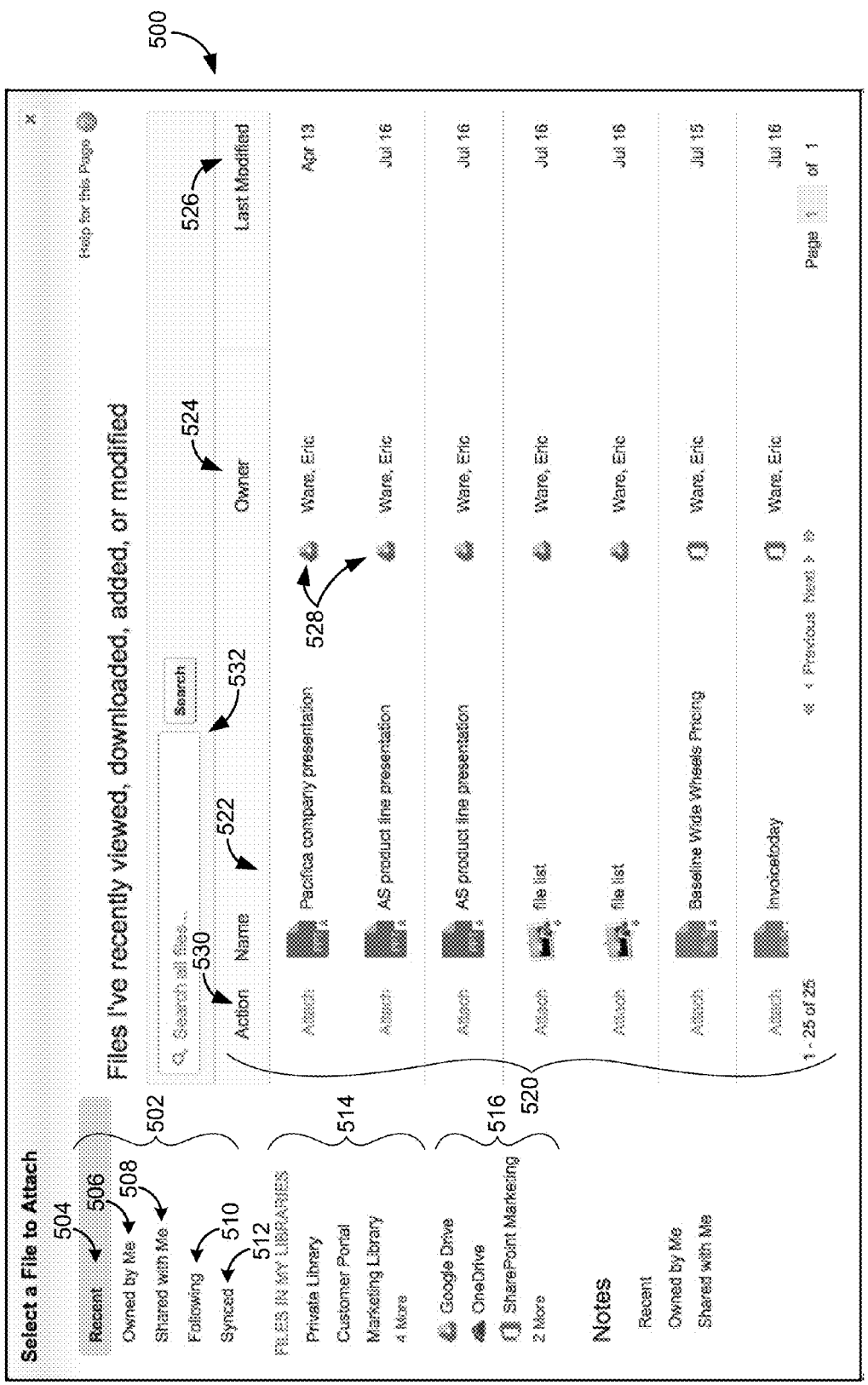
FIG. 5 shows an example WUI 500 displayed after an authorized user selects to share a file according to some implementations.

FIG. 5 shows an example WUI 500 displayed after an authorized user selects to share a file according to some implementations. For example, the WUI 500 is an example of an overlay, pop-up window or page that can be displayed after a user selects a Select button as described above with reference to FIG. 4. The WUI 500 includes a first categories section 502 enabling the authorized user to filter through different categories or virtual directories of files by selecting various side-tabs, buttons or links. In the illustrated implementation, the authorized user can select a "Recent" tab 504 to view and select a file that the authorized user has recently viewed, downloaded, added, modified or otherwise accessed; an "Owned by Me" tab 506 to view and select a file that the authorized user owns; a "Shared with Me" tab 508 to view and select a file that has been shared with the user by other users; a "Following" tab 510 to view and select a file that the authorized user is subscribed to; or a "Synced" tab 512 to view and select a file that the authorized user has chosen to sync to the user's local computing device.

In the illustrated example, the Recent tab 504 has been selected by the authorized user. Responsive to the selection of the Recent tab 504, a listing 520 of recent files is displayed. The listing 520 generally includes a number of rows, each row corresponding to a particular file. The user can scroll through and select a file to share from the listing 520 or search for a particular file of interest to share via a search bar 532. In various implementations, the files displayed in the listing 520 can be displayed chronologically by a last-modified date, alphabetically by name, or otherwise arranged in a manner the user desires. The names of the respective files are shown in a "Name" column 522, the names of the owners of the respective files are shown in an "Owner" column 524, and the dates on which the respective files were last modified are shown in a "Last Modified" column 526. In the illustrated example, the listing 520 also includes identifications of the locations of respective files that are stored in external ("third party") storage locations, for example, in the form of symbolic icons 528 associated with the respective third parties (described in more detail below). In an "Action" column 530 next to each file, the user can select to attach (or choose) the file of interest to share. In some implementations, the user also can select to view a file before selecting to attach the file to share by clicking on or otherwise selecting the file. In some implementations, responsive to the user clicking on or otherwise selecting to view a particular file, a "File Details" page is rendered (for example, in the form of an overlay, pop-up window or a new page) that displays a preview of the current version of the file enabling the user to navigate through different pages of the file, and in some implementations, to view various information associated with the file.

The authorized user also can view and select to share files via a number of other mechanisms and interfaces. For example, the authorized user can select an "Owned by Me" tab 506 to view files that the authorized user owns, for example, files that the authorized user is an owner of, an author of, or has otherwise created or first made accessible to the database system. Responsive to the selection of the Owned by Me tab 506, a listing similar to the listing 520 of recent files is displayed. Owned files can include files the authorized user has previously created using cloud-based software or services provided by the database system (such files can be stored in the database system by default). Owned files also can include files, or references to files, the authorized user has created using software or services external to or otherwise not provided via the database system. For example, such externally-created files can remain stored in external third party storage locations including cloud-based databases (for example, such as Google Drive®, Microsoft OneDrive® or Microsoft Sharepoint® among other possibilities). In the illustrated implementation, the WUI 500 also includes a section 516 enabling the user to specifically view and select files from various external third party storage locations, for example, such as those just described.

In some implementations or instances, the user can upload an externally-created file to the database system for storage by the database system (for example, using the Upload button described above with reference to FIG. 4). In some other implementations or instances, the user can upload an externally-created file to the database system without storing the file in the database system. In such latter implementations, the user can link an externally-created file to the database system (for example, by uploading a reference to the file to the database system). In some implementations, when a file is linked from an external third party storage location, the content in the file itself (for example, the textual, graphical, image, video or audio content) is not copied to the database system. Rather, in some such implementations, a reference to the file is stored in the database system as described above. For example, the reference can include a locator such as a uniform resource locator (URL) or other address associated with a storage location of the file, as well as in some instances other identifying or authorizing information.

The WUI 500 also includes a libraries section 514 enabling the authorized user to view and select files from various libraries the user is a member of, libraries the user subscribes to, libraries that have been shared with the user, or libraries the user otherwise has access to. For example, the example libraries section 514 includes a private library, a customer portal library and a marketing library. Files in libraries also can be selected via the Libraries tab 414 in the WUI 400 described with reference to FIG. 4. In some implementations, libraries maintained by the database system are examples of trusted truth locations. In other words, the files that are published in libraries are generally no longer collaborative (at least to users internal to an organization); rather, such files can be considered official or final (at least for an extended duration of time). In some implementations, to preserve the integrity of files published in libraries, when a file is published to a library, rights to edit the file are restricted to administrators of the library, and in some instances, also to the owner or author of the file.

Files published in libraries can include files for facilitating users' roles, education or understanding, and in such instances, are generally made available to a broader user base than files that are not published. Files published in libraries can include actual designs, case studies, technical specifications, technical support documents, marketing presentations, various lists or reports, and a wide assortment of other files that are in a finalized form suitable for broad dissemination and access. In some other instances, files published in libraries can be intended for distribution outside of an organization as well. For example, such files can be shared in libraries when in late stages of development; that is, close to being ready for submission for approval by senior level management or for submission to third parties, such as customers of the organization or sellers that provide supplies, products or services to the organization. In other words, files shared in libraries may be more ready for external communication or collaboration outside of the organization (or at least a broader or different audience of users within an organization) than files shared with particular individuals or groups, which may be in earlier stages of development and made available only for internal collaboration within the organization or a small group of collaborating users within the organization.

As described above, collaboration on a file among collaborating users can be achieved or practiced using one or more of a number of mechanisms and interfaces. For example, collaborating users can share updates on a collaborative file by embedding changes, edits or comments within an updated version of a collaborative file itself. For example, a collaborating user can download a file from an associated feed item in a network feed, from a file details page, or through any of a number of virtual directories. In such implementations, the collaborating user can then makes changes to or otherwise edit the downloaded version or add comments within the downloaded version. The collaborating user can then upload the updated version via a network feed for viewing or review by other collaborating users. In some other instances, a collaborating user may select to preview a collaborative version of a file posted to a network feed. In such instances, the collaborating user can provide comments or otherwise collaborate with other collaborating user via comments to the feed item itself.

Figure 6:
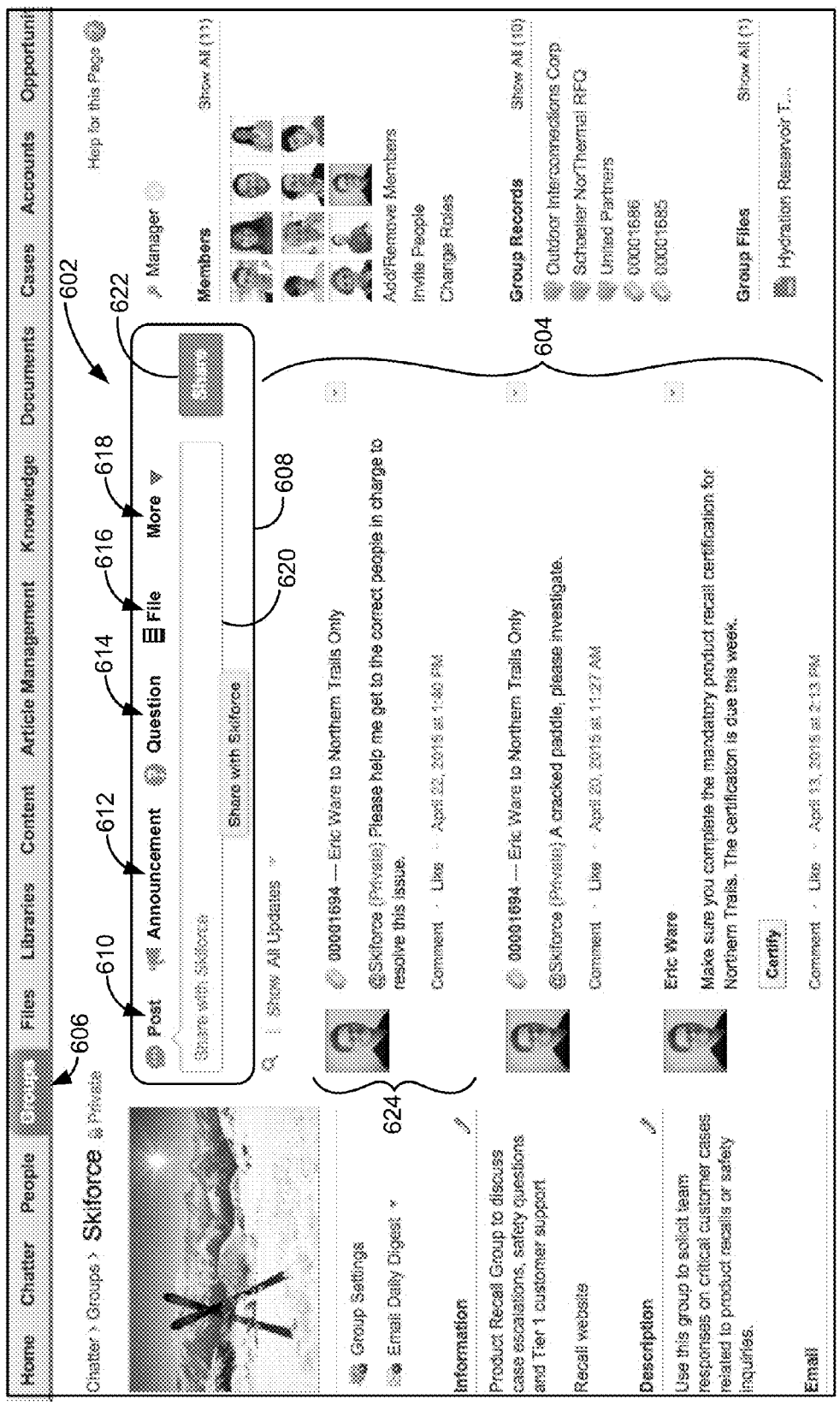
FIG. 6 shows an example WUI displaying a group subpane including a group feed according to some implementations.

In some organizations, collaboration on a file is often performed at the group level. FIG. 6 shows an example WUI 600 including a group sub-pane 602 including a group feed 604 according to some implementations. For example, the WUI 600 and group sub-pane 602 can be displayed after selecting a Groups tab 606. The group feed 604 facilitates collaboration and interaction among members of the respective group. In the illustrated example, the WUI 600 displays a group page for the group "Skiforce." The WUI 600 includes a publication interface 608 at a top portion of the group sub-pane 602 that enables the user to submit publications to the group feed 604. In the illustrated example, the user can select a format or context for the publication by selecting the "Post" sub-tab 610, the "Announcement" sub-tab 612, the "Question" sub-tab 614, a "File" sub-tab 616, or a "More" sub-tab 618. The arrangement of the publication interface 608 and the number and function of various UI elements displayed in the publication interface 608 can be tailored to a specific type of publication depending on which of the sub-tabs is selected to facilitate the publication. For example, the Post sub-tab 610 (selected in the illustrated example) enables the user to enter content in the form of text in a text box 620. The user can also elect to reference other users, groups or records by, for example, "@-mentioning" or otherwise tagging or identifying such users, groups or records in the text box 620. The user can submit (publish) the publication to the group feed 604 by selecting a "Share" button 622.

As another example, the Announcement sub-tab 612 enables the user to share an announcement, an event invitation or to describe an event. As another example, the Question sub-tab 614 enables the user to publish a question. In some implementations, a published question can be distinguished from a normal post by the manner the question is displayed in a feed item or by the manner in which other users are notified of its publication. As another example, the File sub-tab 616 enables a user to share a file with the group, which will then be published as a feed item in the group feed 604 as well as in some implementations the respective user feeds of the members of the group. Furthermore, a More sub-tab 618 can allow a user to perform or cause other actions. For example, upon a user selecting the More sub-tab 618, a drop-down menu or pick list can be displayed below the selected sub-tab providing the user with selectable options or actions the user can choose.

As shown, the group feed 604 includes feed items 624 published by other members of the group. As shown, the user viewing the group feed 604 can select to comment on the feed items, like feed items or share feed items via Comment and Like links or by selecting to display a drop-down menu next to the feed item. For example, when the user selects a Comment link, a comment window can be displayed in the feed item in an area below the original publication. In some implementations, after a user selects a share button from a drop down menu, a pop-up window can be displayed enabling the user to select other users, groups or records for which to share the feed item.

Figure 7:
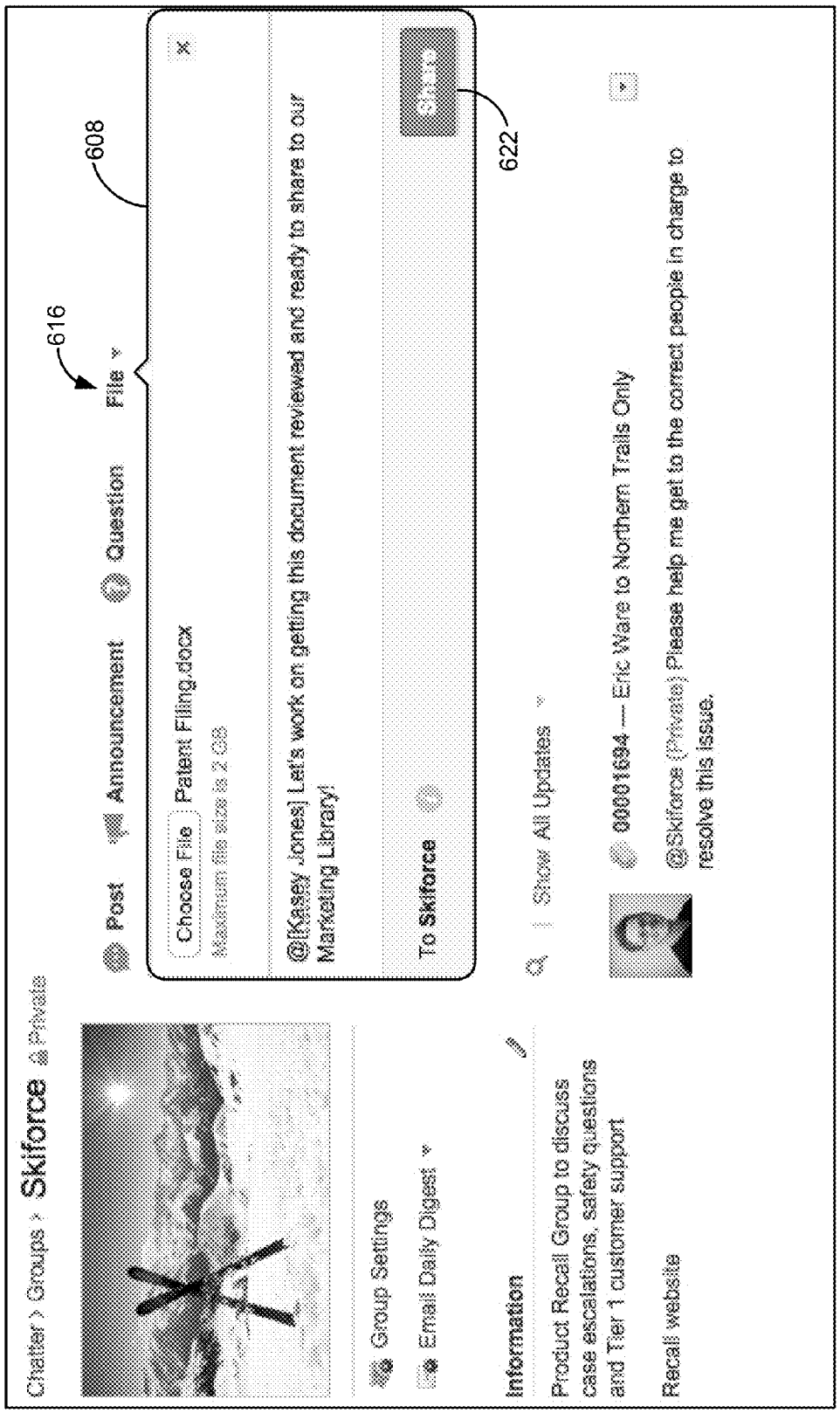
FIG. 7 shows a portion of an example publication interface enabling an authoring user to share a file with the group shown in FIG. 6 according to some implementations.

FIG. 7 shows an example publication interface 608 enabling an authorized user (for example, an owner or author) to share a file with the group shown in FIG. 6 according to some implementations. For example, the publication interface 608 is an example of a mechanism enabling an authorized user to select to share a file with collaborating users as in block 302 of the process 300 of FIG. 3. In the implementation illustrated with reference to FIG. 7, the publication interface 608 is reconfigured relative to that shown in FIG. 6 because the user has selected the Files sub-tab 616. In the illustrated example, the authorized user has selected a file "Patent Filing.docx" to share with the Skiforce group. As described above, the file can be uploaded from the user's local computing device or selected from available files previously stored in or referenced in the database system 16. In the illustrated example, the owner also has @-mentioned a second collaborating user "Kasey Jones," and has written a textual message (for example, a description of the project associated with the file) to be shared with Kasey Jones and other members of the group (collaborating users with respect to the selected file). The authorized user can then share the file with the group by clicking on or otherwise selecting the share button 622.

Figure 8:
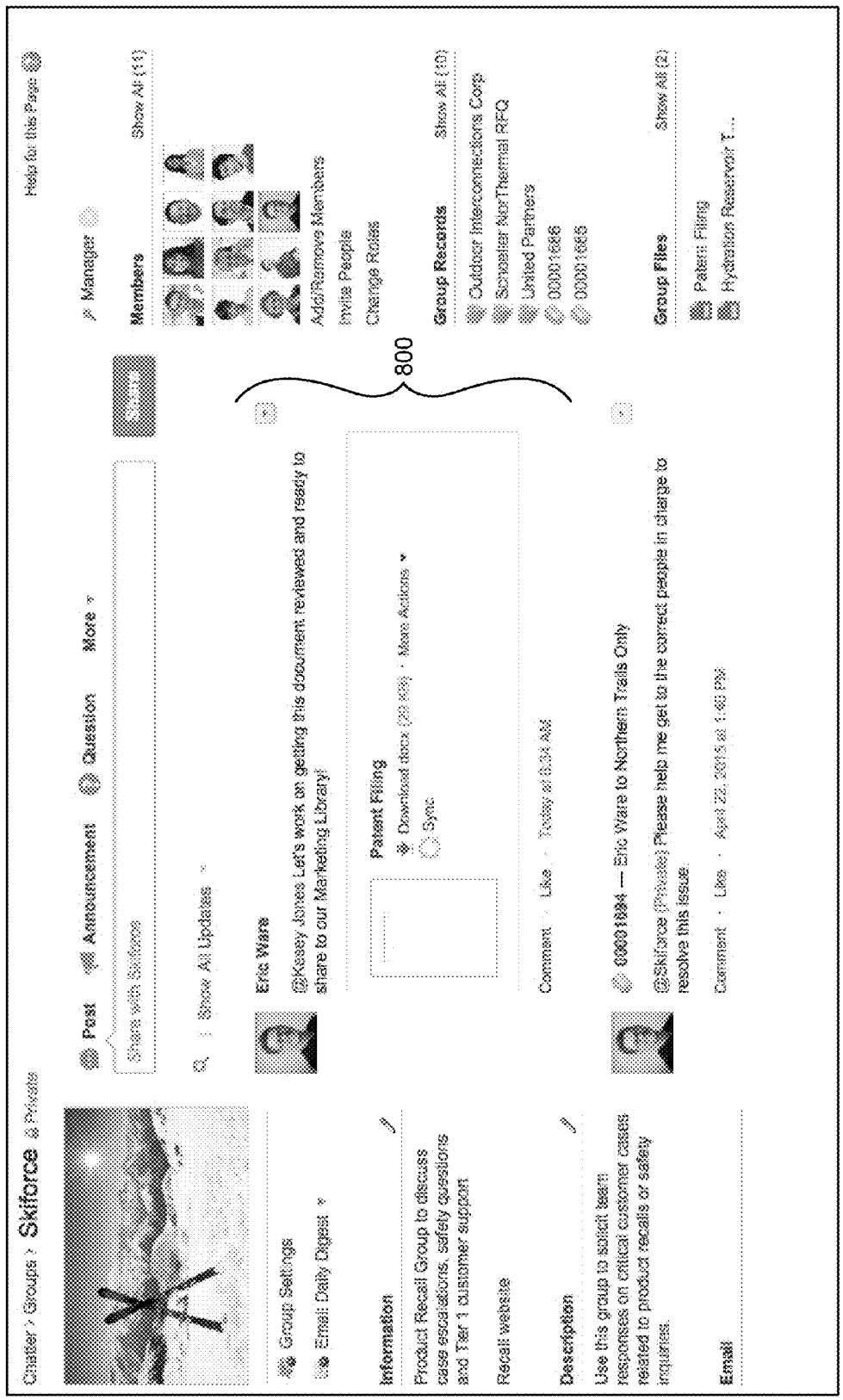
FIG. 8 shows the example WUI of FIG. 6 including a feed item generated after sharing the selected file of FIG. 7 with the group according to some implementations.

FIG. 8 shows the example WUI of FIG. 6 including a feed item 800 generated after sharing the selected file of FIG. 7 with the group according to some implementations. For example, the feed item 800 includes the file "Patent Filing" shared with the group Skiforce via the publication interface 608 of FIG. 7. Other users to whom the file has been shared are now considered collaborating users, and as such, have collaborator permissions associated with the file. The collaborating users include the members of the group Skiforce as well as any other users or members of groups @-mentioned when the authorized user shared the file or to whom or which the file is subsequently shared. For example, collaborator permissions enable the collaborating users to view, edit and upload new versions of the file. For example, the collaborating users can download the file or sync the file to their local computing devices using respective download and sync links shown within the feed item 800 in FIG. 8 so that the collaborating users can then edit the file.

Figure 9:
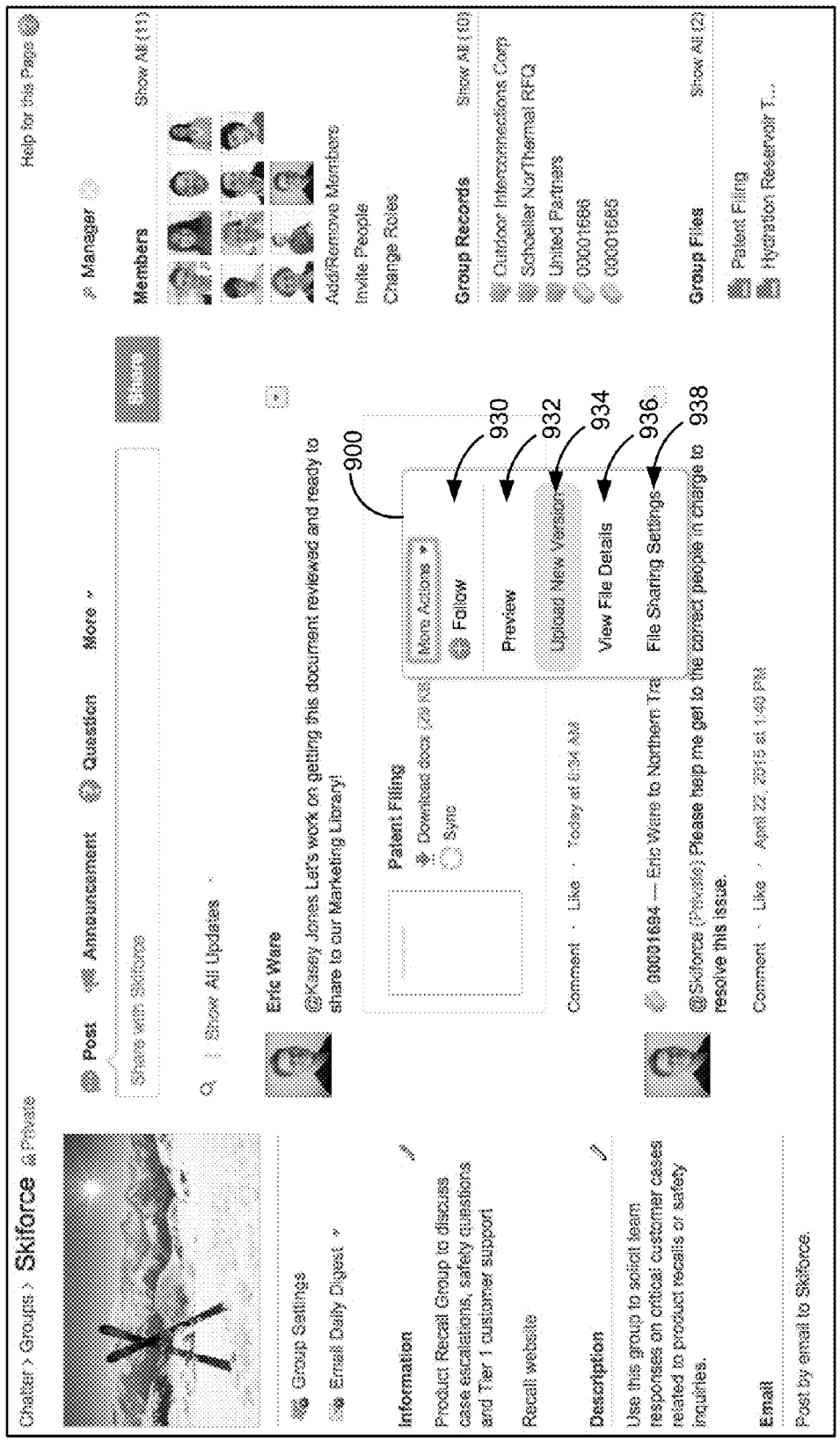
FIG. 9 shows the example WUI of FIG. 8 including an Actions menu displayed next to the feed item according to some implementations.

FIG. 9 shows the example WUI of FIG. 8 including an Actions menu 900 displayed next to the feed item 800 according to some implementations. The Actions menu 900 enables the authorized user that shared the file, and in some implementations also the other collaborating users, to subscribe to (follow) the file by selecting a Follow menu item 930, preview the file by selecting a Preview menu item 932, view a file details page associated with the file by selecting a View File Details menu item 936, view the file sharing settings associated with the file by selecting a File Sharing Settings menu item 938 and to upload new edited versions of the file for subsequent consideration, discussion and other collaboration with the other collaborating users.

Figure 10:
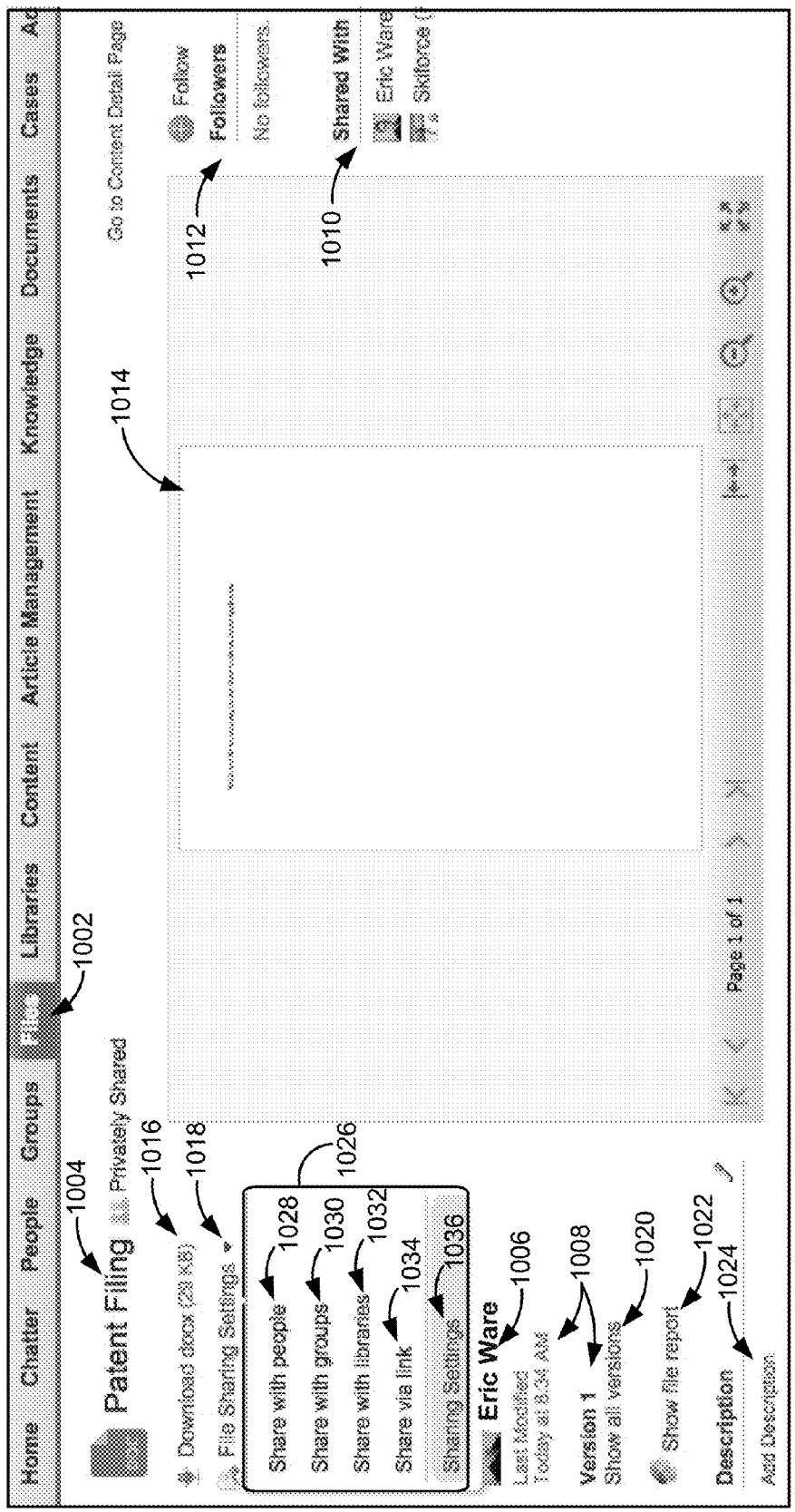
FIG. 10 shows an example WUI including a file details page for the file shared using the publication interface of FIG. 7 according to some implementations.

FIG. 10 shows an example WUI including a file details page 1000 for the file shared using the publication interface of FIG. 7 according to some implementations. As shown, the file details page (or "sub-pane") 1000 is displayed under the Files tab 1002. The file details page 1000 identifies the name of the file in a title section 1004, an owner of the file in a field 1006, and various other details concerning the file including version information 1008 including a current version number, the date and time the current version was saved, uploaded, received or stored, among other desirable information. The file details page 1000 also include a section showing the users the file is shared with (the collaborating users). In the illustrated implementations, the file details page 1000 further includes a section 1012 showing other users (followers) subscribed to the file (none in the illustrated example). In some implementations in which the owner of the current version is different than the owner of the file, the owner responsible for the current version also can be displayed. The file details page 1000 further includes a viewing interface 1014 for viewing the file.

The file details page 1000 also includes action button 1016 enabling an authorized user to download the file, an action button 1018 enabling an authorized user to view file sharing settings, an action button 1020 enabling an authorized user to view all versions of the collaborative file, an action button 1022 enabling an authorized user to view a file report, and an action button 1024 enabling an authorized user to add a description of the file. In the example interface shown, the authorized user has selected the file sharing settings action button 1018, resulting in the display of a file sharing settings drop-down menu 1026. Within the file sharing settings drop-down menu 1026, the authorized user can select to share the file with other users (people) via menu item 1028, share the file with groups via menu item 1030, share the file with libraries via menu item 1032, or share the file as a link via menu item 1034. In this way, the authorized user can add additional users as collaborating users. The authorized user also can select to view the current sharing settings via a menu item 1036. Of particular note, and referring back to block 310 of the process 300 of FIG. 3, the menu item 1032 is an example of a mechanism enabling the authorized user to publish the file to a library.

Figure 11:
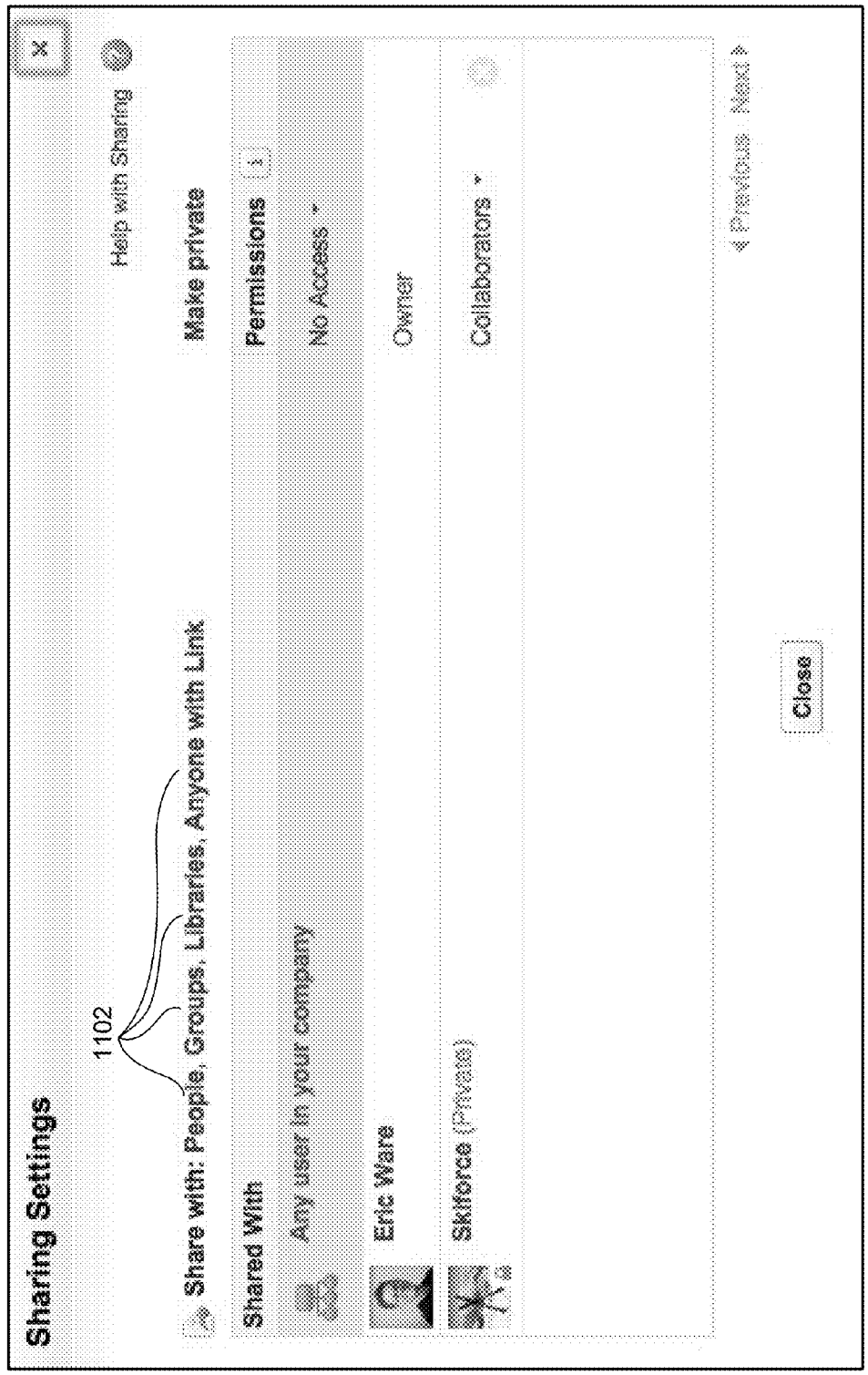
FIG. 11 shows an example WUI displayed after selecting to view sharing settings for the file shown in FIG. 10 according to some implementations.

FIG. 11 shows an example WUI 1100 displayed after selecting to view sharing settings for the file shown in FIG. 10 according to some implementations. For example, the WUI 1100 can be presented in the form of an overlay, pop-up window or new page. As shown, the user can also select to share the file with other people, groups, libraries, or others with a link via selectable action links 1102. Also as shown, the WUI 1100 displays a list of people or groups the file is shared with, or in the case of other users of the organization, can be shared with. For example, the WUI 1100 includes the owner and owner of the file "Eric Ware" as well as the group Skiforce with which Mr. Ware previously shared the file. The WUI 1100 also includes permissions associated with the people and groups listed. For example, the permissions associated with Mr. Ware are "Owner" permissions, while the permissions associated with the Skiforce group are "Collaborators" permissions. Thus, members of the Skiforce group each have collaborator permissions with respect to the file, while Mr. Ware has owner permissions with respect to the file, enabling Mr. Ware to change permissions associated with other users such as those in the Skiforce group as well as those associated with other audiences. For example, users within the general audience definition "Any user in your company" currently have no access.

Figure 12:
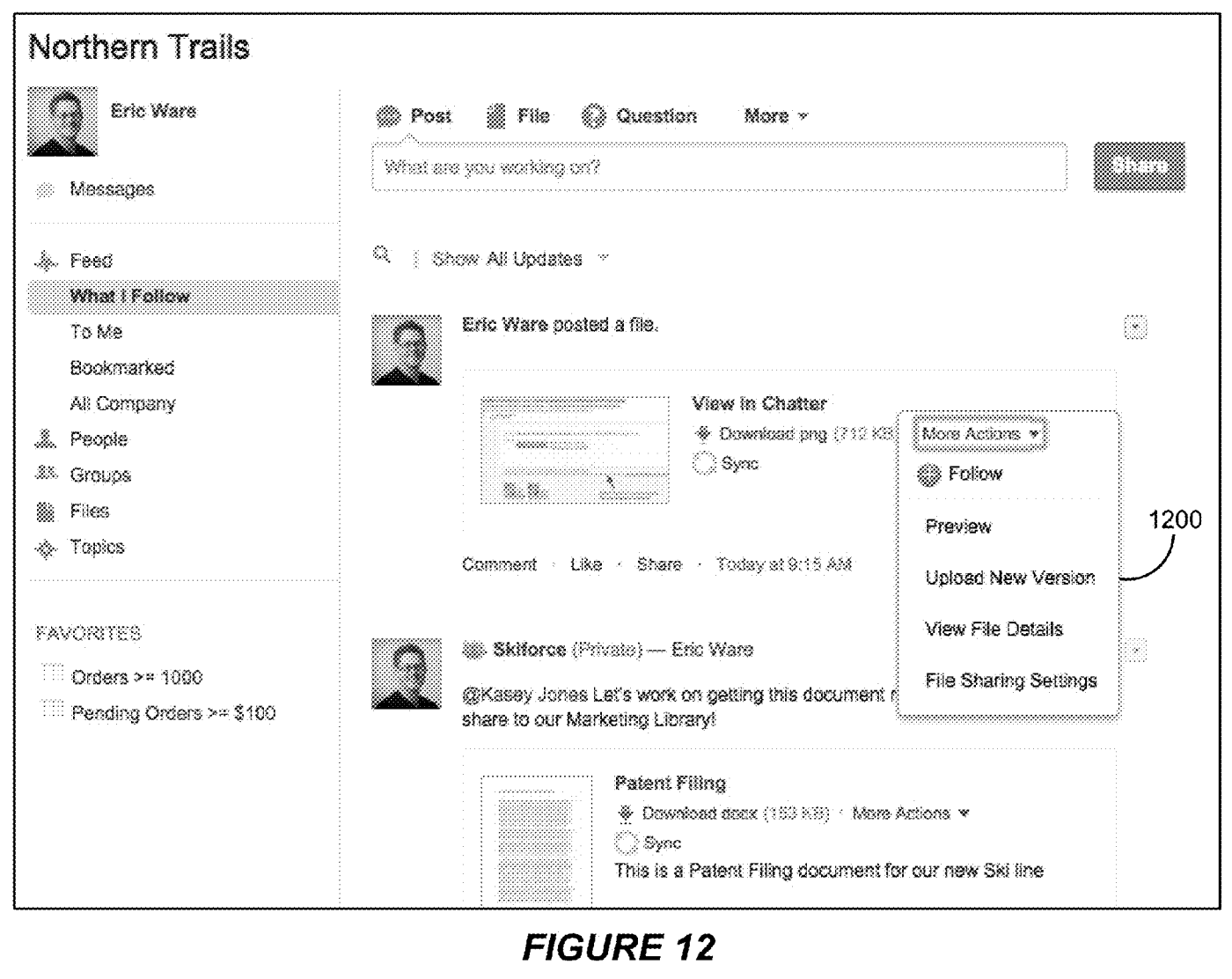

As described above, a goal of sharing the file with other collaborating users is to facilitate collaboration with such other users in creating a final version of the file. This stage of the process can generally be characterized as a collaboration stage. FIG. 12 shows an example WUI including a user feed displaying a feed item for an updated version of the file shown in FIG. 10 according to some implementations. As described above, the collaboration stage can typically involve numerous edits, discussions, meetings, and uploads of new updated versions. It should also be noted that collaboration is not limited to collaboration solely through one or more network feeds. While collaborating users can use network feeds to upload new versions of a collaborative file (for example, using the Action menu 1200 of FIG. 12) and to post messages to other collaborating users, to comment on posts and other comments by other collaborating users, as well as to comment on edited versions uploaded by other collaborating users, collaborating users also can use network feeds to plan and schedule collaboration meetings and discussions. Indeed, collaborating users also can download, sync, view and edit updated versions of the collaborative file using third party services such as via Google Docs, DropBox, Box.com, Microsoft OneDrive and Microsoft Sharepoint, among others. After the file is finalized in a form acceptable to the owner, the owner can then select to share the final version with a library (again, also referred to herein as publishing the file to the library).

Figure 13:
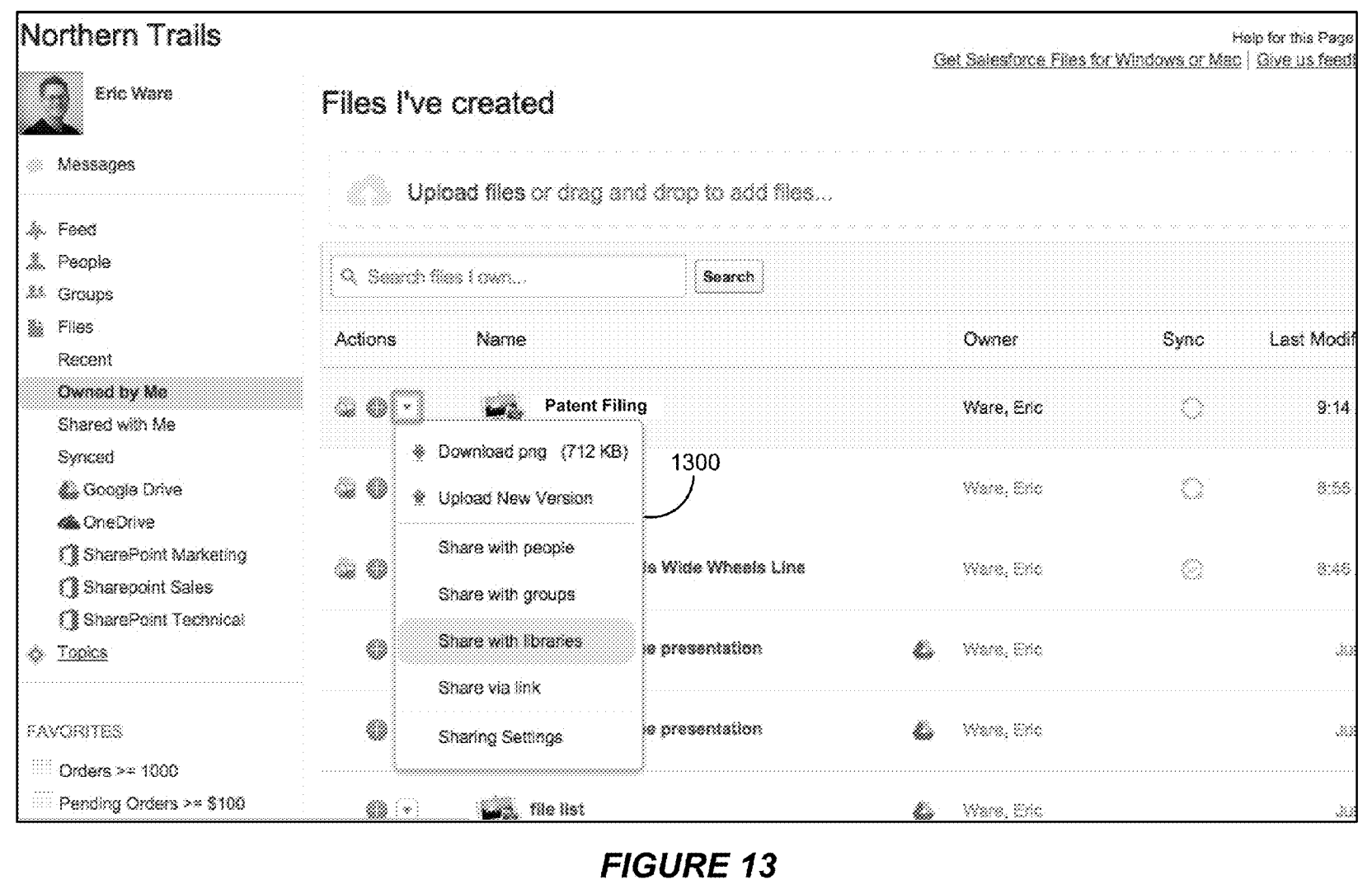
Figure 14:
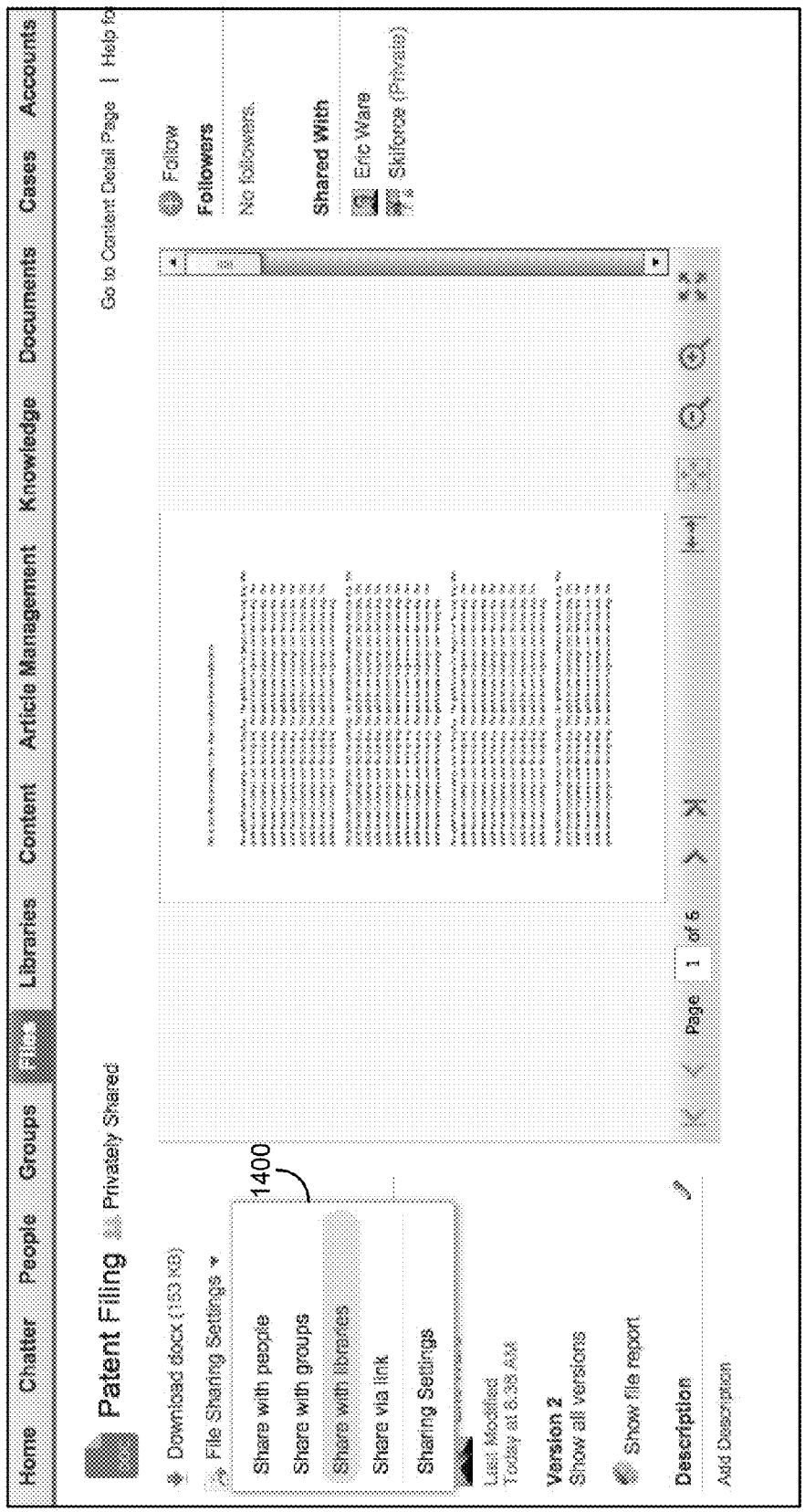
FIG. 14 shows an example WUI for a file details page including a File Sharing Settings menu for the updated version of the file of FIG. 10 according to some implementations.

FIG. 13 shows an example WUI including a listing of files owned by a user and an Actions menu 1300 displayed next to the updated version of the file of FIG. 10 according to some implementations. The Actions menu 1300 is one example, of a mechanism with which the owner can share the final version of the file with a library as in block 310 of the process 300 of FIG. 3. FIG. 14 shows an example WUI for a file details page including a File Sharing Settings menu 1400 for the updated version of the file of FIG. 10 according to some implementations. The file sharing settings menu 1400 is another example of a mechanism by which the owner can share the final version of the file with a library as in block 310 of the process 300 of FIG. 3. The owner also can share the final version with a library via a network feed such as the group feed of the Skiforce group by selecting an action menu within a feed item that includes the final version of the file. The owner also can share the final version of the file via a user feed of the owner.

Figure 15:
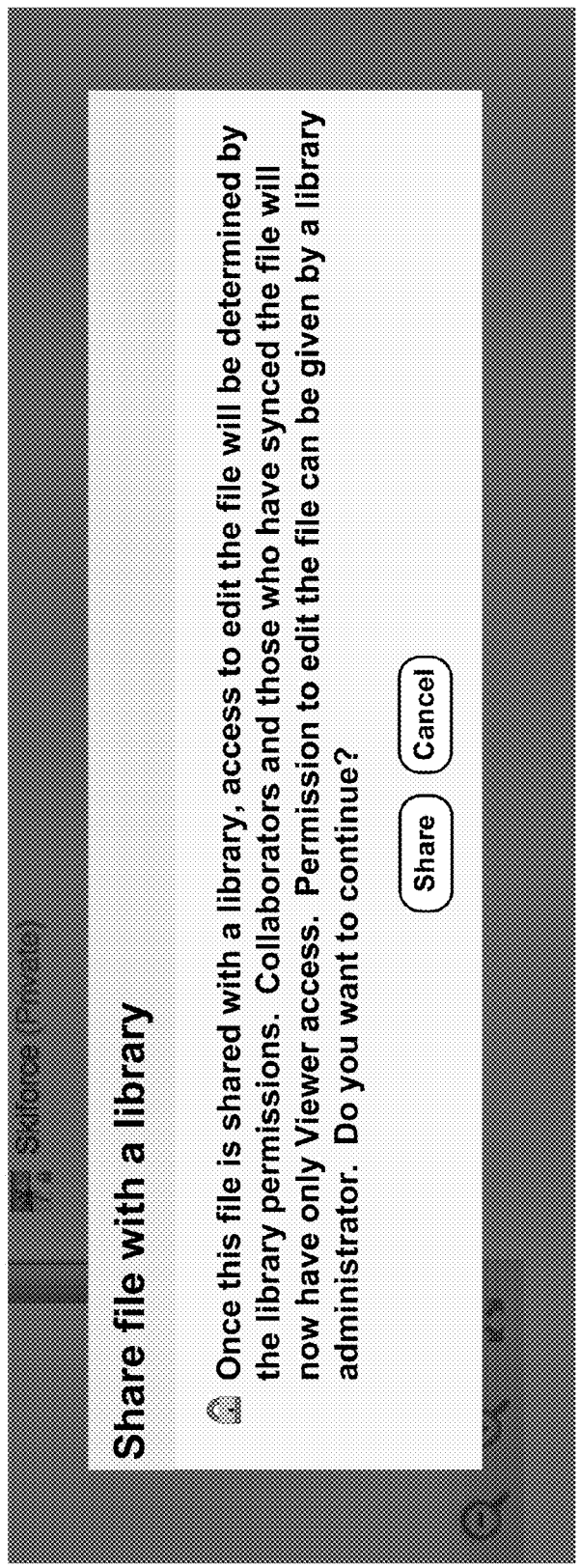
FIG. 15 shows an example WUI notification window displayed after selecting to share the updated version of the file of FIG. 10 with a library according to some implementations.

In some implementations, the sharing of a file with a library cannot be undone by the owner. As such, in some implementations, after the owner selects to share the file with a library, a warning notification is displayed. FIG. 15 shows an example WUI notification window displayed after selecting to share the final updated version of the file of FIG. 10 with a library according to some implementations. The notification warns the owner that once the file is shared with a library, access to edit the file will be subsequently determined by permissions of the library to which it is shared. The owner can then select to continue with sharing the file or to cancel.

Figure 16:
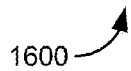
FIG. 16 shows an example WUI publication window displayed after selecting to share the updated version of the file of FIG. 10 with a library according to some implementations.

FIG. 16 shows an example WUI publication window 1600 displayed after selecting to share the updated version of the file of FIG. 10 with a library according to some implementations. For example, the WUI 1600 can be presented in the form of an overlay, pop-up window or new page. As shown, before the file is shared to a library, the owner, author or other authorized user of the file can select a library to share the file to (for example, a "Marketing Library"), as well as include rich metadata with the file. Such metadata can generally make the file more readily discoverable or easy to find by a broad audience of users who may not even have knowledge of the existence of the file, but who are searching one or more libraries to find information they desire. For example, the WUI 1600 enables the authorized user of the file to enter a title and a description of the file. The WUI 1600 also enables the authorized user to select a library with which to share the file. For example, the authorized user can select a library from a drop-down menu that includes the libraries the authorized user has permission to publish to ("publisher permissions"). The authorized user also can associate various tags to the file, for example, by typing in the names of such tags or by selecting from (for example, clicking on) recent tags.

In some implementations, the authorized user also selects a record type for the file from a record type drop down menu (for example, General, Support Document, Sales Asset, Marketing Document). In some implementations, additional metadata also can be added. For example, depending on which record type is selected, the authorized user also can add various other metadata appropriate for the record type. For example, the authorized user can add a document type, for example, product manual, case study, competitive analysis, legal, public relations, product collateral, sales presentation, training, white paper, other, image video, audio.

Figure 17:
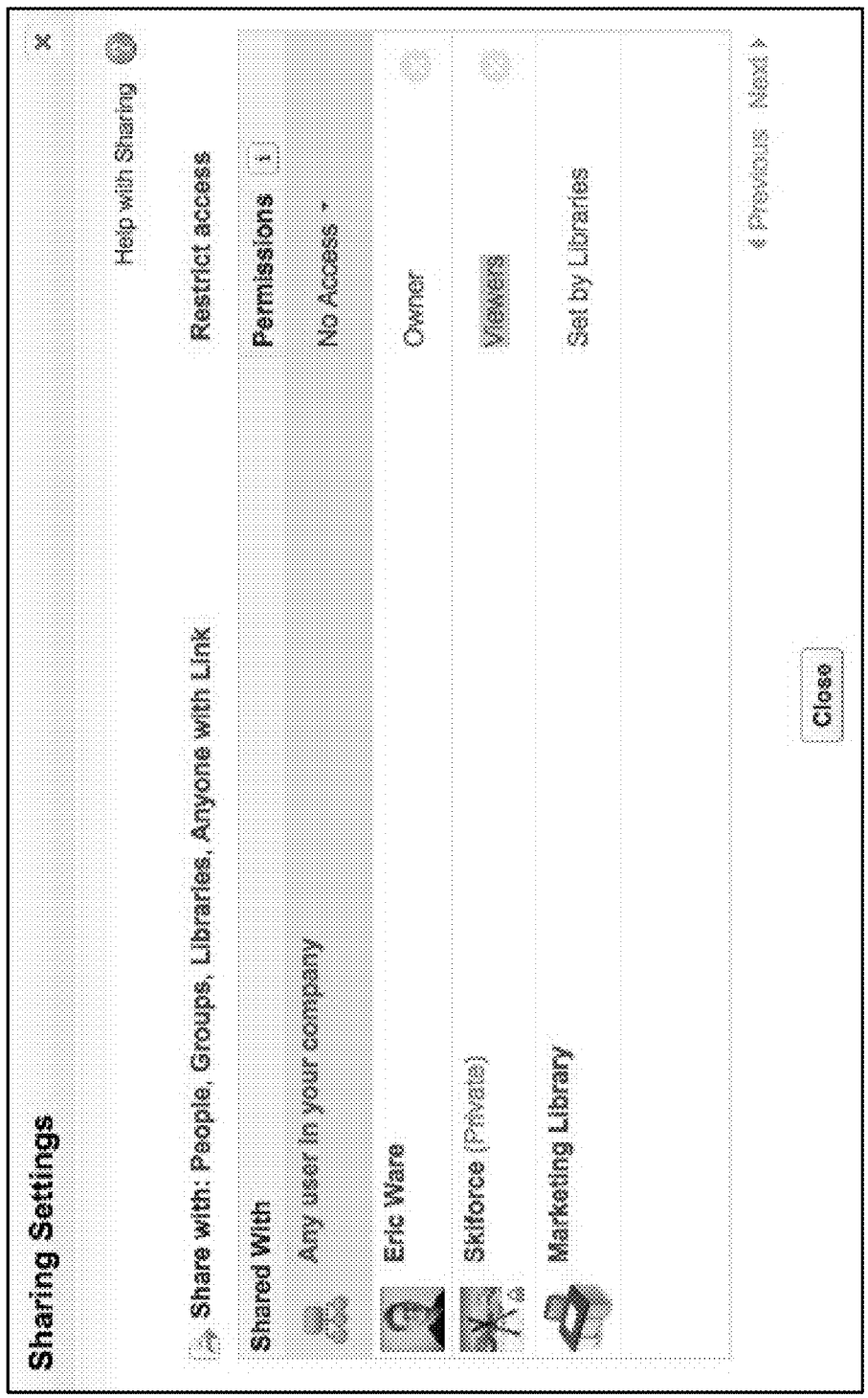
FIG. 17 shows an example WUI window displayed after selecting to view sharing settings for the file shown in FIG. 10 after sharing the file with the library according to some implementations.

When the authorized user is finished adding information about the file or other metadata, the authorized user can then select a Publish button. After the Publish button is selected, the permissions for the file are now governed by the permissions users have with respect to the library with which the file is published as, for example, described above with reference to blocks 316 and 318 of the process 300 of FIG. 3. FIG. 17 shows an example WUI window 1700 displayed after selecting to view sharing settings for the file shown in FIG. 10 after publishing the file to the library according to some implementations. As shown, the file is now listed as shared with the Marketing Library. Also as shown, the owner of the file may still have "Owner" permissions. However, in some implementations, even the owner can't edit the library file at this point unless a library administrator (having "Administrator" permissions) has given the owner "Publisher" permissions (effectively write access to the library). Additionally, the permissions associated with the collaborating users from the Skiforce group are downgraded to "Viewers" permissions as opposed to "Collaborators" permissions. To reiterate, in some implementations users can't update a library file unless they are members of the library and have publisher permissions (unless they are library administrators having administrator permissions).

The library now governs the permissions associated with the file; in other words, the file sharing rules are automatically changed to ensure that the file can only be updated based off of permissions to the library. For example, because the file is now in a published stage as opposed to a collaboration stage, the formerly-collaborating users no longer need to collaborate on the file. Their access to the file is now limited to by their permissions with respect to the library. For example, such users now have access only to view the file in the Marketing Library—they no longer have an option to upload a new version. In some implementations, users with Viewer permissions (hereinafter "viewers") still have access to download the published file, to sync it, and to share it. However, in some implementations, even if a viewer downloads the published file, the file can be secured as read-only. In other implementations, a viewer can download a copy of the file to his local computing device but cannot upload a new edited version of the file having the same name as the library file. Additionally, in some implementations in which a user had formerly synced the file while in the collaborative state, the synced file in the user's local computing device is now automatically synced to the published library version. Additionally, permissions associated with the broad organization-wide audience of users are not changed unless that audience has viewer privileges with the particular library. In some implementations, only an administrator of a library can change the library permissions associated with such an audience.

Also of note, some implementations also reduce or eliminate copy proliferation. For example, in some implementations only one copy of the file is stored—another copy is not made when or after sharing the collaborative file to the library. This ensures that other users finding the file in the library can be assured that the file is the most up-to-date version of the file available. The formerly-collaborative file is effectively transitioned from a collaborative state or status to a non-collaborative state or status (for example, a library state, official state, truth state, or published state). In some implementations, if the collaborative file was stored in the database system 16, the copy or version stored in the database system is now the library copy/version. If only a reference to the collaborative file was stored in the database system, for example, in instances in which the content of the collaborative file is stored external to the database system 16 in a third party storage location, the reference stored in the database system is now the library reference. In this way, if a global search is performed to find the file, only one copy/version of the file will be returned (as opposed to an unofficial copy and an official library copy).

Figure 18:
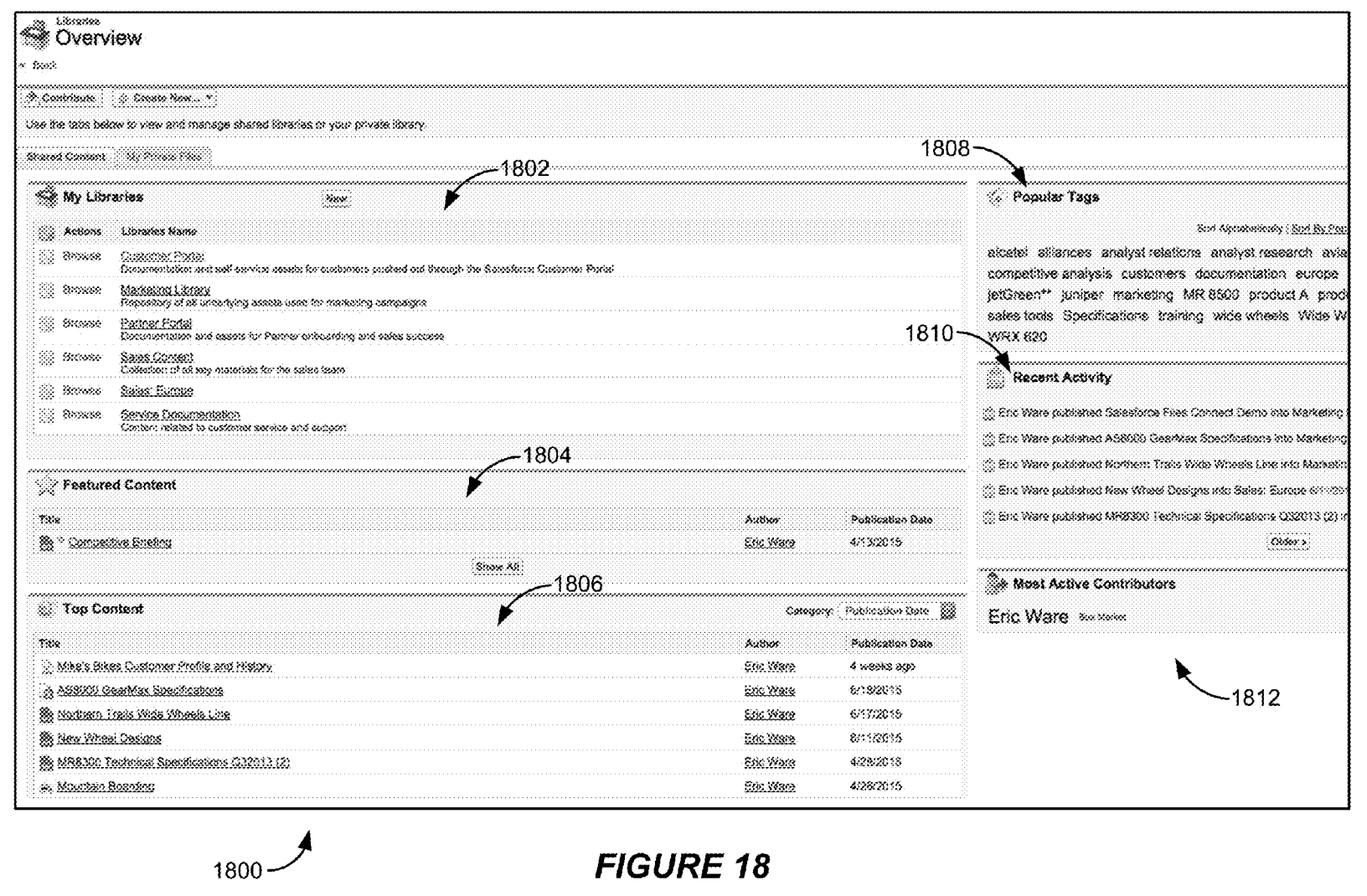

FIG. 18 shows an example WUI for an overview 1800 of libraries accessible to a user according to some implementations. For example, the overview 1800 can be displayed after selecting a Libraries tab. As shown, the overview 1800 includes a "My Libraries" section 1802 listing the libraries the user has access to (for example, because the user has Viewer permissions, Publisher permissions, or Administrator permissions with respect to each of the listed libraries). The overview 1800 also can include a "Featured Content" section 1804, which may show files in one or more of the accessible libraries that have been ranked highly by an administrator. The overview 1800 also can include a "Top Content" section 1806 showing the most popular or otherwise significant files from the accessible libraries. The most popular tags associated with files in the accessible libraries also can be shown in a "Popular Tags" section 1808. The most recent activity associated with files in the accessible libraries also can be shown in a "Recent Activity" section 1810 (for example, files recently published to one or more of the accessible libraries). The most active contributors to the accessible libraries also can be shown in a "Most Active Contributors" section 1812.

Figure 19:
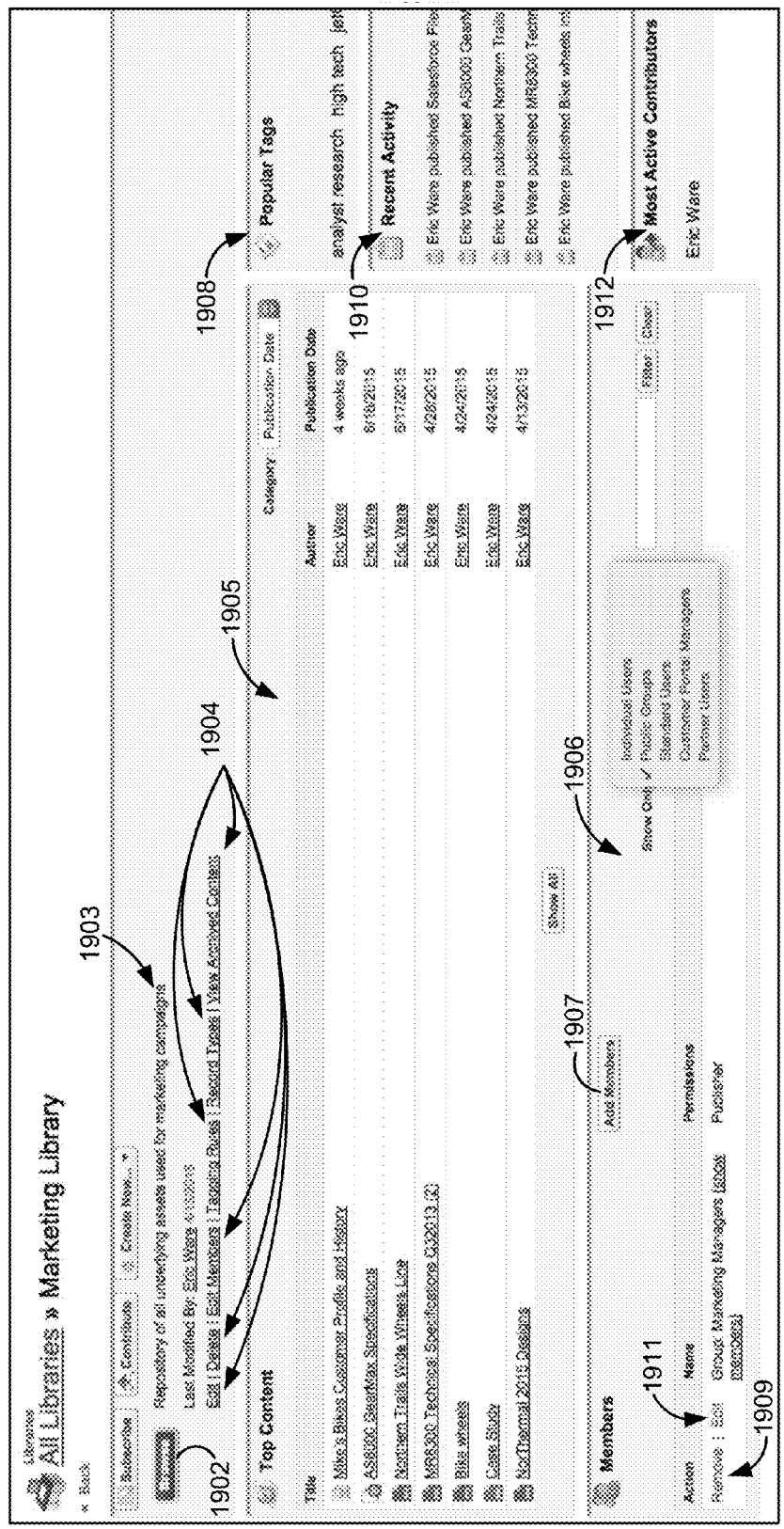
FIG. 19 shows an example WUI including a library details page according to some implementations.

FIG. 19 shows an example WUI for a library details page 1900 according to some implementations. For example, the library details page 1900 can be displayed after the user selects a library from the libraries overview 1800 of FIG. 18. In the illustrated example, the library details page 1900 for the Marketing Library is displayed. The library details page 1900 can include a Browse button 1902 enabling the user to browse all or a subset of the files shared with the library. The library details page 1900 also can include a description of the library's purpose in a section 1903. The library details page 1900 also can include the name of the user who last modified the library as well as the associated date or timestamp associated with the last modification. The library details page 1900 also can include various action links 1904 for performing various actions with respect to the library such as editing or deleting the library or files within the library (for example, if the user is an administrator), editing (for example, adding or removing) members of the library, adding or removing tags or defining various tagging rules, among others. The library details page 1900 also can include a "Top Content" section 1905 showing the most popular or otherwise significant files from the library. The most popular tags associated with files in the library also can be shown in a "Popular Tags" section 1908. The most recent activity associated with files in the library also can be shown in a "Recent Activity" section 1910 (for example, files recently published to the library). The most active contributors to the library also can be shown in a "Most Active Contributors" section 1912. A user with administrator permissions also can view or edit the members of the library in a Members section 1906. For example, the administrator can add members via an Add Members button 1907 as well as remove members via Remove action links 1909. The administrator also can edit the permissions of members via an edit link 1911.

Figure 20:
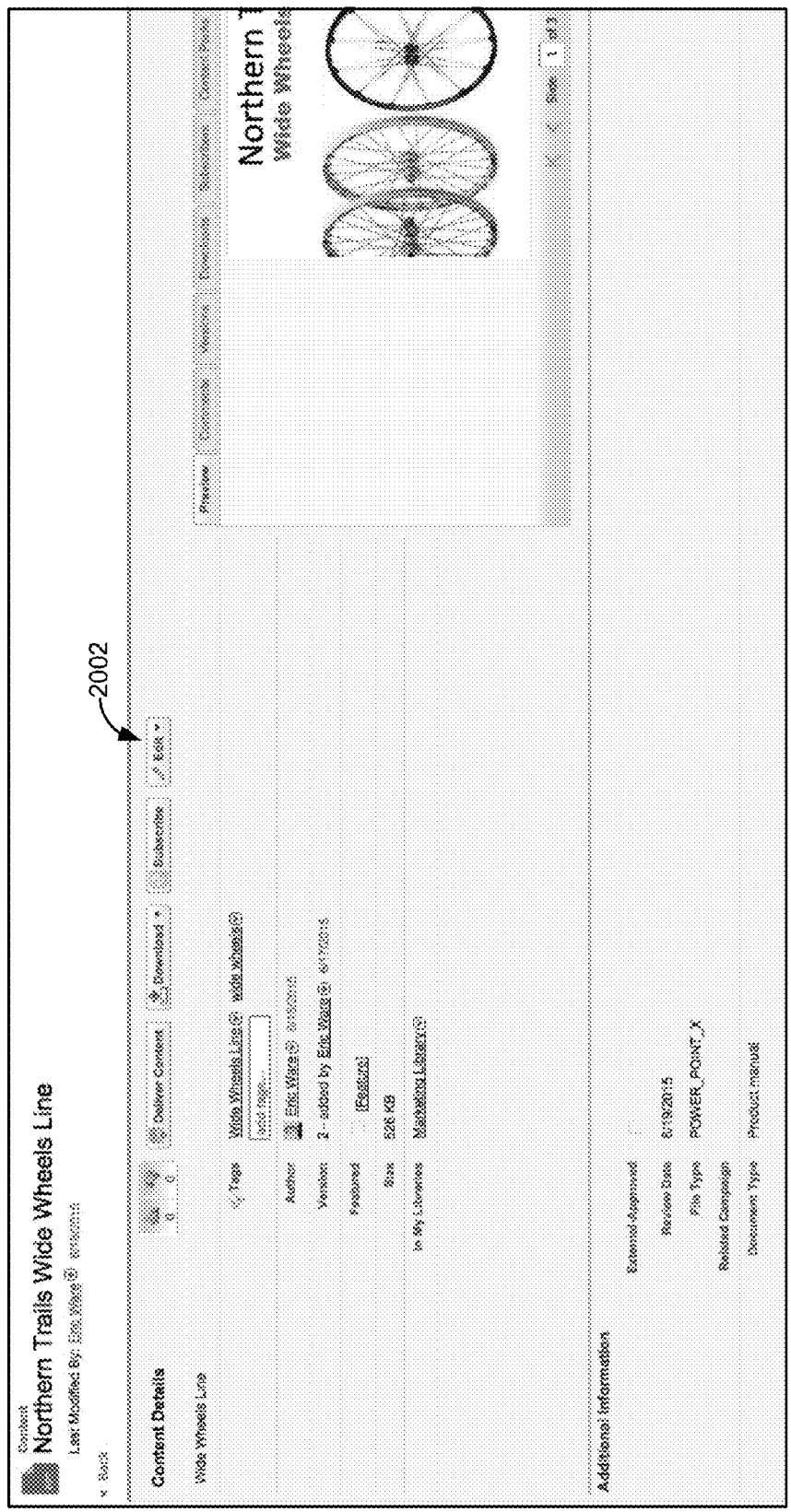
FIG. 20 shows an example WUI including a content details page including metadata for a file published in a library according to some implementations.

FIG. 20 shows an example WUI showing a content details page 2000 including metadata for a file published in a library according to some implementations. For example, the content details page 2000 can show metadata and additional information associated with a library file, as well as enable users having suitable permissions to download the file or subscribe to the file. Permitted users also can add or remove tags, view the author of the file, view version information, view or select whether the file is a featured file, and view which libraries the file has been shared with (published to). Permitted users also can view or indicate whether the file is External-Approved (for example, authorized for distribution or sharing to external parties), view the data of such approval (the review date), view the file type (for example, a slide presentations, a textual document, a video, or audio), view a related campaign (for example, if the file is associated with a sales or marketing campaign), and view a document type (for example, a product manual). The content details page 2000 also includes an interface including selectable tabs enabling the user to view a preview of the file, view comments made about the file (including during collaboration in some implementations), view various versions of the file, view users who have downloaded the file and when they did so, view subscribers to the file, view content packs, among other useful or desirable information.

Figure 21:
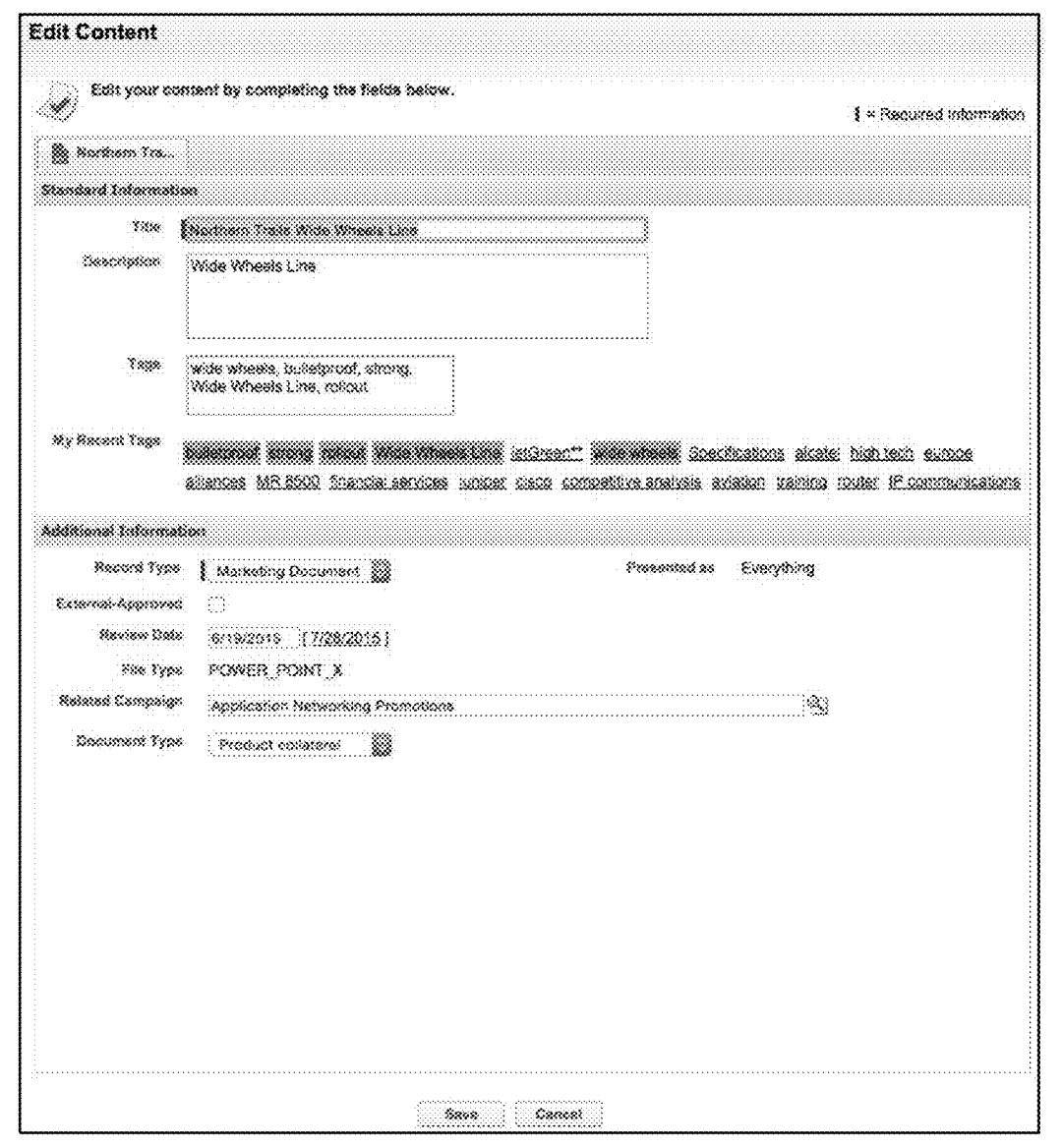

FIG. 21 shows an example edit overlay 2100 displayed after selecting to edit metadata associated with the file of FIG. 20. For example, the edit overlay 2100 can be displayed after a user selects the edit button 2002. The edit overlay 2100 enables a permitted user to edit various content details and other metadata associated with the file, for example, to correct certain information but also to facilitate or increase the discoverability of the file to users not having knowledge of the file or not knowing the location of the file. For example, similar to the publication overlay 1600, a permitted user can enter a title and a description of the file, associate various tags to the file, select a record type for the file, and depending on the record type, add a document type (for example, product manual, case study, competitive analysis, legal, public relations, product collateral, sales presentation, training, white paper, other, image video, audio) among various other metadata appropriate for the record type or the file in general.

In some implementations, users also can subscribe to various libraries, files and even tags to facilitate the discovery or acquisition of various information of interest. Subscribed users can get emails, feed updates or other notifications when new information associated with such libraries, files or tags is added or updated similar to the way users receive such notifications when there are updates associated with various other users, groups, records, or communities the user is subscribed to.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for sharing and publishing files, the system comprising:
    a multi-tenant database system implemented using a server system, the multi-tenant database system configurable to:
        maintain a multi-tenant user database including user data associated with users of the multi-tenant database system;
        maintain a multi-tenant file database including file data associated with a plurality of files;
        maintain a library of published files;
        receive a first request initiated by a first user of the multi-tenant database system to share a first file of the plurality of files with one or more second users of the multi-tenant database system, the first user having a first set of one or more permissions enabled with respect to the first file, the first set of one or more permissions defining access privileges to the first file by the first user;
        enable, responsive to the first request, a second set of one or more permissions for each of the second users, the second set of one or more permissions defining access privileges to the first file by each of the second users;
        receive a second request initiated by the first user to publish the first file to the library;
        publish, responsive to the second request, the first file to the library;
        disable the second set of one or more permissions for each of the second users;
        restrict access to the published first file based on one or more permissions associated with the library; and
        responsive to a third request to access the published first file, cause transmission of a message to a user device associated with the third request, the message indicating the restricted access to the published first file.

2. The system of claim 1, the second set of one or more permissions including one or more permissions enabling each of the second users to edit the first file.

3. The system of claim 1, the restricting of the access to the published first file including restricting access to the published first file by each of a plurality of collaborating users.

4. The system of claim 1, the multi-tenant database system further configurable to:
    receive a fourth request initiated by the first user to upload the first file or to upload a reference to the first file;
    store the uploaded first file or the uploaded reference to the first file in the multi-tenant file database; and
    enable the first set of one or more permissions for the first user responsive to the fourth request.

5. The system of claim 4, wherein content of the first file remains stored in a third party storage location.

6. The system of claim 1, wherein the publishing of the first file to the library includes updating a status of the first file in the multi-tenant file database to identify that the first file is a published file.

7. The system of claim 1, wherein the publishing of the first file to the library includes storing a published version of the first file is a different storage location than a non-published version of the first file.

8. The system of claim 1, the multi-tenant database system further configurable to receive an updated version of the first file and to store the updated version of the first file in the multi-tenant file database, wherein the published first file is the updated version of the first file.

9. The system of claim 1, the multi-tenant database system further configurable to provide a networking environment enabling the first user and the second users to collaborate on the first file via one or more network feeds.

10. The system of claim 1, the multi-tenant database system further configurable to provide an interface enabling the first user to associate metadata to the published first file in the library.

11. A method for sharing and publishing files, comprising:
    maintaining, by one or more servers, a multi-tenant user database including user data associated with users of a multi-tenant database system;
    maintaining, by one or more servers, a multi-tenant file database including file data associated with a plurality of files;
    maintaining, by one or more servers, a library of published files;
    receiving, by one or more servers, a first request initiated by a first user of the multi-tenant database system to share a first file of the plurality of files with one or more second users of the multi-tenant database system, the first user having a first set of one or more permissions enabled with respect to the first file, the first set of one or more permissions defining access privileges to the first file by the first user;
    enabling, responsive to the first request, a second set of one or more permissions for each of the second users, the second set of one or more permissions defining access privileges to the first file by each of the second users;
    receiving, by one or more servers, a second request initiated by the first user to publish the first file to the library;
    publishing, responsive to the second request, the first file to the library;
    disabling the second set of one or more permissions for each of the second users;
    restricting access to the published first file based on one or more permissions associated with the library; and
    responsive to a third request to access the published first file, causing transmission of a message to a user device associated with the third request, the message indicating the restricted access to the published first file.

12. The method of claim 11, the second set of one or more permissions including one or more permissions enabling each of the second users to edit the first file.

13. The method of claim 11, the restricting of the access to the published first file including restricting access to the published first file by each of a plurality of collaborating users.

14. The method of claim 11, further comprising:
receiving a fourth request initiated by the first user to upload the first file or to upload a reference to the first file;
storing the uploaded first file or the uploaded reference to the first file in the multi-tenant file database; and
enabling the first set of one or more permissions for the first user responsive to the fourth request.

15. The method of claim 11, further comprising receiving an updated version of the first file and storing the updated version of the first file in the multi-tenant file database, wherein the published first file is the updated version of the first file.

16. A computer program product comprising computer-readable program code capable of being executed by one or more processors when retrieved from a non-transitory computer-readable medium, the program code comprising instructions configurable to cause:
maintaining, by one or more servers, a multi-tenant user database including user data associated with users of a multi-tenant database system;
maintaining, by one or more servers, a multi-tenant file database including file data associated with a plurality of files;
maintaining, by one or more servers, a library of published files;
receiving, by one or more servers, a first request initiated by a first user of the multi-tenant database system to share a first file of the plurality of files with one or more second users of the multi-tenant database system, the first user having a first set of one or more permissions enabled with respect to the first file, the first set of one or more permissions defining access privileges to the first file by the first user;
enabling, responsive to the first request, a second set of one or more permissions for each of the second users, the second set of one or more permissions defining access privileges to the first file by each of the second users;
receiving, by one or more servers, a second request initiated by the first user to publish the first file to the library;
publishing, responsive to the second request, the first file to the library;
disabling the second set of one or more permissions for each of the second users;
restricting access to the published first file based on one or more permissions associated with the library; and
responsive to a third request to access the published first file, transmitting a message to a user device associated with the third request, the message indicating the restricted access to the published first file.

17. The computer program product of claim 16, the second set of one or more permissions including one or more permissions enabling each of the second users to edit the first file.

18. The computer program product of claim 16, the restricting of the access to the published first file including restricting access to the published first file by each of a plurality of collaborating users.

19. The computer program product of claim 16, the instructions further configurable to cause:
obtaining a fourth request initiated by the first user to upload the first file or to upload a reference to the first file;
storing the uploaded first file or the uploaded reference to the first file in the multi-tenant file database; and
enabling the first set of one or more permissions for the first user responsive to the fourth request.

20. The computer program product of claim 16, the instructions further configurable to cause obtaining an updated version of the first file and storing the updated version of the first file in the multi-tenant file database, wherein the published first file is the updated version of the first file.

* * * * *